(12) United States Patent
Donnelly et al.

(10) Patent No.: US 12,097,893 B2
(45) Date of Patent: Sep. 24, 2024

(54) REMOTE OPERATION OF A POWERED BURDEN RAIL CAR

(71) Applicant: RHT Rail Haul Technologies Corp., North Vancouver (CA)

(72) Inventors: Frank Wegner Donnelly, Vancouver (CA); Tony Maciulewicz, Grapevine, TX (US); John D. Watson, Evergreen, CO (US)

(73) Assignee: RHT Railhaul Technologies Corp. (CA)

( * ) Notice: Subject to any disclaimer, the term of this patent is extended or adjusted under 35 U.S.C. 154(b) by 224 days.

(21) Appl. No.: 17/558,027

(22) Filed: Dec. 21, 2021

(65) Prior Publication Data
US 2022/0194437 A1 Jun. 23, 2022

Related U.S. Application Data

(60) Provisional application No. 63/128,621, filed on Dec. 21, 2020.

(51) Int. Cl.
*B61C 3/00* (2006.01)
*B61C 9/50* (2006.01)
(Continued)

(52) U.S. Cl.
CPC ............ *B61C 3/00* (2013.01); *B61C 9/50* (2013.01); *B61C 17/12* (2013.01); *B61L 25/025* (2013.01)

(58) Field of Classification Search
CPC .. B61C 3/00; B61C 9/50; B61C 17/12; B61L 25/025; Y02T 30/00; B61D 7/00
(Continued)

(56) References Cited

U.S. PATENT DOCUMENTS 1,973,267 A 9/1934 Rabey
2,402,266 A 6/1946 Williams
(Continued)

FOREIGN PATENT DOCUMENTS

| CN | 105501011 | 4/2016 |
| WO | WO 2010/043967 | 4/2010 |
| WO | WO 2020/121057 | 6/2020 |

OTHER PUBLICATIONS

"Welcome to Parallel Systems," Parallel Systems, copyright date 2022, retrieved Jan. 28, 2022 from https://moveparallel.com/, 3 pages.
(Continued)

*Primary Examiner* — Yi-Kai Wang
(74) *Attorney, Agent, or Firm* — Sheridan Ross P.C.

(57) ABSTRACT

The use of short consists of powered and unpowered freight cars for moving cargo from its source to transfer facilities is described. The use of short consists of powered and unpowered freight cars can enable the efficient operation of unit trains. Single self-powered rail cars or short consists (up to about 25 cars) can overcome a number of problems associated with long unit trains such as dynamic instabilities, inability to stop quickly if needed and long headway time required between trains. A system of feeder trains (aggregators) to facilitate keeping unit trains in more or less constant motion is described. The use of gearing and shafts for power transmission from traction motors installed on various types of freight cars using the structure of the existing freight car truck is also described.

23 Claims, 24 Drawing Sheets

(51) Int. Cl.
*B61C 17/12* (2006.01)
*B61L 25/02* (2006.01)

(58) Field of Classification Search
USPC .......................................................... 701/19
See application file for complete search history.

(56) References Cited

U.S. PATENT DOCUMENTS

| | | | |
|---|---|---|---|
| 3,841,228 | A | 10/1974 | Hall |
| 4,793,047 | A | 12/1988 | Curtis et al. |
| 8,113,121 | B2 | 2/2012 | Roop |
| 8,215,238 | B2 | 7/2012 | Roop |
| 8,215,591 | B2 | 7/2012 | Roop |
| 8,428,796 | B2 | 4/2013 | Donnelly |
| 8,561,545 | B2 | 10/2013 | Donnelly |
| 8,622,352 | B2 | 1/2014 | Roop |
| 9,032,881 | B2 | 5/2015 | Goding |
| 9,176,076 | B2 | 11/2015 | Roop |
| 9,302,685 | B2 | 4/2016 | Goding |
| 2002/0062194 | A1* | 5/2002 | Kliman ............. G01H 1/003 702/35 |
| 2010/0114404 | A1* | 5/2010 | Donnelly ........... B61L 27/04 701/2 |
| 2013/0019774 | A1* | 1/2013 | Ahuja ................. B61C 9/50 105/133 |
| 2014/0083246 | A1* | 3/2014 | Venturi ............... B60K 6/442 903/902 |
| 2020/0216100 | A1 | 7/2020 | Donnelly |
| 2021/0380150 | A1 | 12/2021 | Soule et al. |

OTHER PUBLICATIONS

Bellan, "Former SpaceX engineers bring autonomous, electric rail vehicle startup out of stealth," TechCrunch, Jan. 19, 2022, retrieved from https://techcrunch.com/2022/01/19/former-spacex-engineers-bring-autonomous-electric-rail-vehicle-startup-out-of-stealth/, 18 pages.

Eudaly et al., "Santa Fe Rails, vol. 1," White River Productions, Kansas City, MO, 1996, pp. 1-13, 16-17, 20-21, 52-69, 144. Submitted in Two Parts.

Reed et al., "Comprehensive Guide to Industrial Locomotives, Third Edition," Rio Hondo, 2002, 400 pages. Submitted in Three Parts.

Reed et al., "Critters, Dinkys & Centercabs: The identification guide for small American gas and Diesel locomotives," Rio Hondo, 2000, 192 pages. Submitted in Two Parts.

International Search Report and Written Opinion for International (PCT) Patent Application No. PCT/IB2019/001305, dated Apr. 23, 2020, 9 pages.

International Preliminary Report on Patentability for International (PCT) Application No. PCT/IB2019/001305, dated Jun. 24, 2021, 6 pages.

U.S. Appl. No. 18/139,055, filed Apr. 25, 2023, Donnelly.

Official Action (with English translation) for Brazil Patent Application No. BR112021011195-6, dated Jul. 4, 2023, 5 pages.

Notice of Allowance for Canada Patent Application No. 3123163, dated May 30, 2023, 2 pages.

International Preliminary Report on Patentability for International (PCT) Patent Application No. PCT/IB2021/000893, dated Jun. 29, 2023, 5 pages.

International Search Report and Written Opinion for International (PCT) Patent Application No. PCT/IB2019/00893, dated Apr. 21, 2022, 7 pages.

Official Action for Canada Patent Application No. 3123163, dated Jan. 10, 2023, 4 pages.

Official Action for Chile Patent Application No. 1546-2021, dated Jan. 27, 2023, 20 pages.

Notice of Allowance for Chile Patent Application No. 1546-2021, dated Mar. 17, 2023, 1 page.

Notice of Allowance for U.S. Appl. No. 16/712,452, dated Feb. 1, 2023, 7 pages.

Official Action for U.S. Appl. No. 16/712,452, dated Sep. 13, 2022, 8 pages.

Official Action for Australia Patent Application No. 2019397569, dated Jul. 5, 2022, 4 pages.

Official Action for Chile Patent Application No. 1546-2021, dated May 25, 2022, 21 pages.

* cited by examiner single car
  powered car
Fig. 9a
 unpowered car
short consist
  powered car
Fig. 9b
 unpowered car
long consist
  powered car
 unpowered car

REMOTE OPERATION OF A POWERED BURDEN RAIL CAR

CROSS REFERENCE TO RELATED APPLICATION

The present application claims the benefits of U.S. Provisional Application No. 63/128,621, filed Dec. 21, 2020, entitled "Remote Operation of a Powered Burden Rail Car", which is incorporated herein by this reference in its entirety.

FIELD OF INVENTION

The disclosure relates generally to the use of short consists of powered and unpowered freight cars for moving cargo from its source to transfer facilities so as to enable the efficient operation of unit trains.

BACKGROUND OF THE INVENTION

Moving bulk materials from a point of origin to a final destination over short distances, typically a few miles to up to about a hundred miles, can be expensive. Bulk materials can be moved these distances by truck, rail, conveyor system, pipeline or the like. The problem can be made more difficult when the point of origin or final destination moves, as the case of an advancing work face in a mine, for example.

Some of the problems of moving bulk materials are illustrated by examples from the mining industry. Materials including ore are moved around in mining operations by a number of means including:
 large haul trucks
 conveyor systems
 slurry pipelines
 rail transport Trucks have an advantage that they can go anywhere a road can be built. However, trucks, especially large mining trucks, are expensive to purchase and operate, and they usually require a driver. There are some mines that have automated trucks wherein the operator controls the truck from a remote location or autonomously using an algorithm. Nevertheless, large mining trucks also require specialty tires and fuel and both can be expensive.

Most mining haul trucks have a two-axle design, but some have had three axles. Haul truck load capacities range from 35 tons to 450 tons. Large quarry-sized trucks range from 40 to 100 tons. The largest, highest-payload-capacity haul trucks are referred to as ultra class trucks. The ultra class includes all haul trucks with a payload capacity of about 275 tons or greater.

Conveyor systems have advantages in certain mining situations where the ore and environmental situations are favorable. A major drawback of conveyor systems is that the ore or waste rock usually must be crushed. In other situations, conveyor systems can be maintenance intensive and can cause serious delays in production when they are shut down for repair. For example, ore in oil sands surface mines can be like hard rock in the winter and sticky asphalt in the hot summer months, making conveyor maintenance expensive in both seasons. Also if a section of conveyor breaks down, the whole conveyor line must be shut down until the section is repaired. Conveyor systems in underground mines can be particularly costly to maintain and repair because of the close quarters typical of most underground mining operations.

Slurry transport systems are suitable for ores that can be formed into a slurry. A major drawback of slurry systems is that the ore or waste rock must be crushed to small sizes that are compatible with slurry transport. These systems, also called hydro-transport systems, are often used in conjunction with another transport system since the slurry cannot usually be formed at or near the working face. Slurry systems are often used where transport distances are large and fixed such as for example from a slurry plant on a mine site to a remote processing plant.

Rail systems have an advantage that they are a highly fuel efficient system because of low rolling resistance. The have a disadvantage that tracks must be laid and are relatively difficult to move, for example when the mining face moves in an open pit operation. Industrial rail systems typically involve one or more locomotives pulling or pushing a number of unpowered bulk material carrier cars. In this configuration, a disadvantage of mining rail systems is that they are limited by track adhesion considerations to grades in the range of about 3 percent to about 7 percent.

Small load carrying, self-powered transfer rail cars are known. The Atlas Car & Mfg. Co. of Cleveland Ohio makes electric transfer cars for steel plants, ore processing refineries and other applications. The General Electric Company has manufactured small load carrying locomotives (10 ton load capacity) in the early 1900s. Small battery powered load carrying locomotives (5 ton load capacity) have been manufactured for the explosives industry. None of these has been automated nor have they utilized multiple propulsion sources (internal combustion engines, energy storage and grid power).

U.S. Pat. No. 8,428,796 entitled "Rail Conveyance System for Mining" discloses a rail-based system for moving materials and in particular relates to a rail-based system comprised of automated self-powered rail cars operating independently to transport material such as ore from a work face in a mine to a processing plant or cargo from a dock to a major transportation hub. A number of automated self-powered cargo carrying rail cars are operated on a track conveyance system that can also be controlled remotely by either manual or automated means or by a combination of the two. Thus, the rail conveyance system can be partially or fully automated. The rail cars are individually operable by any of several propulsion means including an on-board engine or engines, an energy storage system such as for example a battery pack or by an outside source of power such as an overhead wire or an electrified third rail. Each car includes two or more truck assembles. Each truck assembly may include one or more axles. Preferably, at least one axle on each car is powered, more preferably most of the axles are powered, and even more preferably all the axles are powered. The principal reason for powering at least one and most preferably all of the axles is to provide maximum tractive force so that the cars are capable of ascending grades without wheel slippage in the range of preferably at least about 10 percent, more preferably at least about 12.5 percent and most preferably at least about 15 percent. This is a benefit especially for application in open pit or underground mines where a rail-based haulage system capable of ascending steep grades offers several advantages over a truck-based or conveyor-based haulage system. It is preferable that the self-powered cargo carrying rail cars or the burden cars of the present invention have a ratio of driver (sometimes referred to as driven) axles to total axles of at least about 0.167, more preferably a ratio of at least about 0.5 and most preferably a ratio of about 1.

There is a need for a cost effective method of moving cargo from its point of origin to a mainline rail head where the cargo can be transferred efficiently to a unit train.

The present disclosure describes a powered burden rail car used for pulling short trains along railway tracks wherein the powered burden rail car may be remotely operated. This disclosure also describes configurations of rail consists using combinations of powered and unpowered burden rail cars as a means to transfer cargo to and from large unit trains.

SUMMARY OF THE INVENTION

This disclosure relates to the use of short consists of powered and unpowered freight cars for moving cargo from its source to transfer facilities so as to enable the efficient operation of unit trains.

This disclosure also describes types of consists with 1 or more powered burden cars. Single self-powered rail cars or short consists (up to about 25 cars) overcome a number of problems associated with long unit trains such as dynamic instabilities, inability to stop quickly if needed and long headway time required between trains.

This disclosure also describes a system of feeder trains (aggregators) to facilitate keeping unit trains in more or less constant motion.

This disclosure further describes the use of gearing and shafts for power transmission from traction motors installed on various types of freight cars using the structure of the existing freight car truck.

For required tractive effort and speed, applying an electric tractive drive power train to an existing mass-produced freight car truck requires higher volumetric power density of the drive machinery than would be used in locomotive truck because of the limited space within the freight car truck. This higher volumetric power density is achieved with high-speed traction motors with speed capability above 5,000 rpm; gear ratios of greater 12:1 and effective air or liquid cooling of the traction motor.

The high gear ratio between the traction motors and wheel mounted axles requires two stages because the 12:1 or higher gear ratio is beyond the practical limits of a single stage. To accomplish this double gear reduction in the limited space available within the truck and under the car will also allow for movement of car through curves. The gear reduction is accomplished in two separated gear reducers connected by a jackshaft. This jackshaft that connects the gear reducers runs parallel to the axles and at a comparable height to the height of the top of the axle when the car is loaded. This limited height of the jackshaft and spacing of the two sets of gear reducers close to the wheels allows for the center sill to pass over traction drive train and not interfere with the truck's relative movement to the car body when the car is moving through curves.

Other improvements, such as fuel storage underneath the freight car between the two trucks, are described. This includes storage of gaseous fuels.

These and other needs are addressed by the present disclosure. The various embodiments and configurations of the present disclosure are directed generally to providing one of more powered burden rail cars for pulling short trains along railway tracks wherein at least one powered burden rail car may be remotely operated. This disclosure also describes configurations of rail consists using combinations of powered and unpowered burden rail cars for a number of applications including transferring cargo to large unit trains.

The following definitions are used herein:

Adhesion is a measure of the resistance of friction to slippage between two parallel planes. In the case of a locomotive rail wheel, the parallel plane is the point on the steel rail wheel where the rail wheel contacts the steel rail. The maximum force or pull that a locomotive can generate in order to pull a train is limited by the weight of the locomotive and the amount of adhesion that it can maintain without wheel slippage.

A rail aggregator facility, as used herein, is a facility in which a cargo is off-loaded from one or more trains and stored and, later, on-loaded to another train or trains. An example of such an aggregator or transfer facility would be oil storage tanks or grain elevators next to a rail siding. The use of a rail aggregator facility is distinct from a transfer process in which the cargo of one train is directly transferred to another train.

Autonomous control means controlled by a computer algorithm with sensor inputs such as, for example, spatial positioning, vehicle speed and location of other nearby objects.

A bogie is a term used outside of North America that means a truck assembly (see definition of truck assembly).

A bolster is a structural component connecting a locomotive truck assembly to the frame of a locomotive so as to allow vertical, transverse and/or longitudinal movements of the truck assembly with respect to the locomotive car frame. For a locomotive with more than one truck assembly, the bolster can allow the locomotive body to rotate on the bolster assembly in order to negotiate curves and grades.

A burden car is a single car that carries cargo and provides its own propulsion.

A center sill is the main longitudinal structural member of a car underframe, often constructed as a large box section or hat section.

A consist is a sequence of railroad cars that form a unit. For example, locomotive units, coupled pneumatically, permit multiple operation of locomotive air brake equipment from a single controlling unit. Units in a consist may be further include: units on which the power source is shut down or not operating; units on which the power source is operating. These units may be on-line and effective for normal operation or off-line and ineffective.

A driver (or driven) axle is a rotating axle that transmits power from the propulsion system to the rails. A driver may refer to an axle or a wheel.

Dynamic braking is typically implemented when the electric propulsion motors are switched to generator mode during braking to augment the braking force. The electrical energy generated is typically dissipated in a resistance grid system. Dynamic braking can also be accomplished using pneumatics or hydraulics.

An energy storage system refers to any apparatus that acquires, stores and distributes mechanical or electrical energy which is produced from another energy source such as a prime energy source, a regenerative braking system, a third rail and an overhead wire and any external source of electrical energy. Examples are a battery pack, a bank of capacitors, a compressed air storage system and a bank of flywheels.

An engine refers to any device that uses energy to develop mechanical power, such as motion in some other machine. Examples are diesel engines, gas turbine engines, microturbines, Stirling engines and spark ignition engines.

A floating bolster means a transverse floating beam member of a truck suspension system supporting the weight of the locomotive body. Such a bolster is not rigidly connected to either the locomotive body or the truck assembly on which it sits.

Grade (also called slope, incline, gradient, pitch or rise) of a physical feature refers to the tangent of the angle of that surface to the horizontal. One way to express slope is as an angle of inclination to the horizontal. Another way is as a percentage which could also be expressed as the tangent of the angle of inclination times 100. In the U.S., this percentage "grade" is the most commonly used unit for communicating slopes in transportation such as rail tracks. In railroad terminology, grade is usually expressed as a percentage, but this is easily converted to the angle a from horizontal or the other expressions. If the tangent is expressed as a percentage, the angle can be determined as: Angle=arctan (% slope times 100).

A hump is a raised section in a rail sorting yard that allows operators to use gravity to move freight railcars into the proper position within the yard when making up trains of cars.

An idler axle is a rotating axle that is not powered. An idler may refer to an axle or a wheel.

The term jack shaft in the context of railroad equipment refers to an electric-motor driven railroad truck wherein the motor is geared to a jack shaft mounted between the side frames. A sliding dog clutch inside the jack shaft can be used to select one of several gear ratios on the chain drive to the driven axle. Railroad jack shafts are generally connected to the driving wheels using side rods. A jack shaft is an intermediate shaft used to transfer power from a powered shaft such as the output shaft of an engine or motor to driven shafts such as the drive axles of a locomotive. As applied railroad locomotives in the 19th and 20th centuries, jack shafts were typically in line with the drive axles of locomotives and connected to them by side rods. In general, each drive axle on a locomotive is free to move about one inch vertically relative to the frame, with the locomotive weight carried on springs. This means that if the engine, motor or transmission is rigidly attached to the locomotive frame, it cannot be rigidly connected to the axle. This problem can be solved by mounting the jack shaft on unsprung bearings and using side-rods or chain drives. In the early 20th century, large numbers of jack shaft-driven electric locomotives were built for heavy mainline service. Jack shaft drives were also used in many early gasoline and diesel locomotives that used mechanical transmissions.

Kicking mean shoving a rail car a short distance and uncoupling it in motion, allowing it to roll free under gravity and/or its own inertia onto a track. Kicking is commonly practiced in bowl or hump yards to make up or break down trains or classify large numbers of cars in an expedient fashion. Kicking differs from a flying switch in that the locomotive is pushing the car rather than pulling it when the cut is made.

Last mile is used to describe the difficulty in getting cargo or people from a transportation hub such as rail yards, truck depots or cargo ports to their final destination. When users have difficulty getting from their starting location to a transportation network, the scenario may alternatively be known as the "first mile problem."

A layshaft is an intermediate shaft within a gearbox that carries gears, but does not transfer the primary drive of the gearbox either in or out of the gearbox. Layshaft is a British term.

A line-haul locomotive is a locomotive primarily engaged in line-haul railroad passenger and freight operations from one city to another as differentiated from local switching service. A locomotive used for the movement of trains between terminals and stations on the main or branch lines of the road, exclusive of switching movements.

A prime power source refers to any device that uses energy to develop mechanical or electrical power, such as motion in some other machine. Examples are diesel engines, gas turbine engines, microturbines, Stirling engines, spark ignition engines or fuel cells.

A road-rail vehicle is a vehicle which can operate both on rail tracks and a conventional road. They may be purpose built road-rail vehicles or they may be converted road vehicles. built road-rail vehicles keep their normal wheels with rubber tires, but are fitted with additional flanged steel wheels (also called guide wheels or pilot wheels) for running on rails. Propulsion is typically through the conventional tires; the flanged wheels being free-rolling; the rail wheels are raised and lowered as needed.

Shinkansen is a Japanese word, commonly meaning bullet train. It is a network of high-speed railway lines in Japan.

Spotting means moving a rail car or cars into their desired positions using a locomotive to get a train loaded or unloaded at a facility.

A switcher, switch engine, or yard goat, is a small railroad locomotive intended not for moving trains over long distances but rather for assembling trains ready for a road locomotive (also known as a line haul locomotive) to take over, disassembling a train that has been brought in, and generally moving railroad cars around—a process usually known as switching.

A traction motor is a motor used primarily for propulsion such as commonly used in a locomotive. Examples are an AC or DC induction motor, a permanent magnet motor and a switched reluctance motor.

Tractive effort is the force applied by the driving wheels parallel to the track. Tractive effort is a synonym of tractive force, typically used in railway engineering terminology when describing the pulling power of a locomotive. The tractive effort provided by a particular locomotive varies depending on speed and track conditions, and is influenced by a number of other factors.

A rail transfer facility, as used herein, is the same as a rail aggregator facility.

A truck assembly is an undercarriage assembly of a locomotive incorporating the train wheels, suspension, brakes and the traction motors. The truck assembly supports the weight of the locomotive, provides the propulsion, suspension and braking. (Outside of North America, a truck assembly is known as a bogie assembly.) Traction motors, typically one on each driving axle, provide propulsion to the wheels. The weight of the locomotive typically rests on a bolster which allows the trucks to pivot so the locomotive can negotiate a curve. Below the bolster, there is typically a leaf spring that rests on a platform suspended by metal links. These links allow the locomotive to swing from side to side. The weight of the locomotive rests on the leaf springs, which compress when the locomotive passes over a bump. This isolates the body of the locomotive from the bump. The links allow the trucks to move from side to side with fluctuations in the track. The system also keeps the amount of weight on each rail relatively equal, reducing wear on the tracks and wheels. Braking is provided by various mechanisms on the trucks. A locomotive typically comprises a body supported near its opposite ends on a pair of truck assemblies (sometimes called bogies). The body includes a main frame or platform, a superstructure, and various systems, subsystems, apparatus and components that are located in the superstructure or attached to the platform. Each truck assembly includes a frame and two or more axle-wheel sets supporting the frame by means of journals near opposite ends of each axle. In addition, a truck assembly typically includes a floating bolster or center plate between the truck frame and a cooperating load-transmitting pin on the underside of the platform. Each locomotive truck may also include two or more electric traction motors, one per axle-wheel set. Each motor is hung on an axle inboard with respect to the associated wheels, and its rotor is mechanically coupled via torque amplifying gearing to that axle. A three-axle truck can be of either symmetrical or asymmetrical construction. If the center axle were located midway between the other two, the truck would be symmetric; if not, it would be asymmetric.

A truck side bearing is a plate or block, roller or elastic unit fastened to the top surface of a truck bolster on both sides of the center plate and functioning in conjunction with a body side bearing to control the relative movement between the truck assembly and the locomotive car body when there are variations in the track.

A unit train is a train operating generally intact between a point of origin and a final destination, often hauling a single bulk commodity, composed of like cars and equipped with high-tensile couplers. Commodities include: granular bulks such as coal, ore, grains and aggregates; and liquid bulks such as petroleum, distillates and chemicals.

Wheel set hunting refers to oscillation or swaying motion of a railway vehicle (often called truck hunting) caused by the coning action on which the directional stability of an adhesion railway depends. It arises from the interaction of adhesion forces and inertial forces. At low speed, adhesion dominates but, as the speed increases, the adhesion forces and inertial forces become comparable in magnitude and the oscillation begins at a critical speed. Above this speed, the motion can be violent, damaging track and wheels and potentially causing derailment. The problem does not occur on systems with a differential because the action depends on both wheels of a wheel set rotating at the same angular rate, although differentials tend to be rare, and conventional trains have their wheels fixed to the axles in pairs instead. The problem was first noticed towards the end of the 19th century when train speeds became high enough to encounter it. Serious efforts to counteract it got underway in the 1930s, giving rise to lengthened trucks and the side-damping swing hanger truck. In the development of the Japanese Shinkansen, less-conical wheels and other design changes were used to extend truck design speeds above 225 km/h (140 mph). Advances in wheel and truck design based on research and development efforts in Europe and Japan have extended the speeds of steel wheel systems well beyond those attained by the original Shinkansen, while the advantage of back-compatibility keeps such technology dominant over alternatives such as the hovertrain and maglev systems. The speed record for steel-wheeled trains is held by the French TGV, at 574.9 km/h (357 mph).

The phrases at least one, one or more, and and/or are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The present disclosure may take form in various components and arrangements of components, and in various steps and arrangements of steps. The drawings are only for purposes of illustrating the preferred embodiments and are not to be construed as limiting the disclosure. In the drawings, like reference numerals may refer to like or analogous components throughout the several views.

FIGS. 9a-c are schematics of three types of consists envisioned by the present disclosure.

DETAILED DESCRIPTION OF THE DRAWINGS

In this disclosure, an apparatus and a method are described that relates to a heavy, multi-axle, self-propelled freight rail car and it relates more particularly to a method of positioning a traction motor in a standard two axle truck assembly.

PRIOR ART

Figure 1:
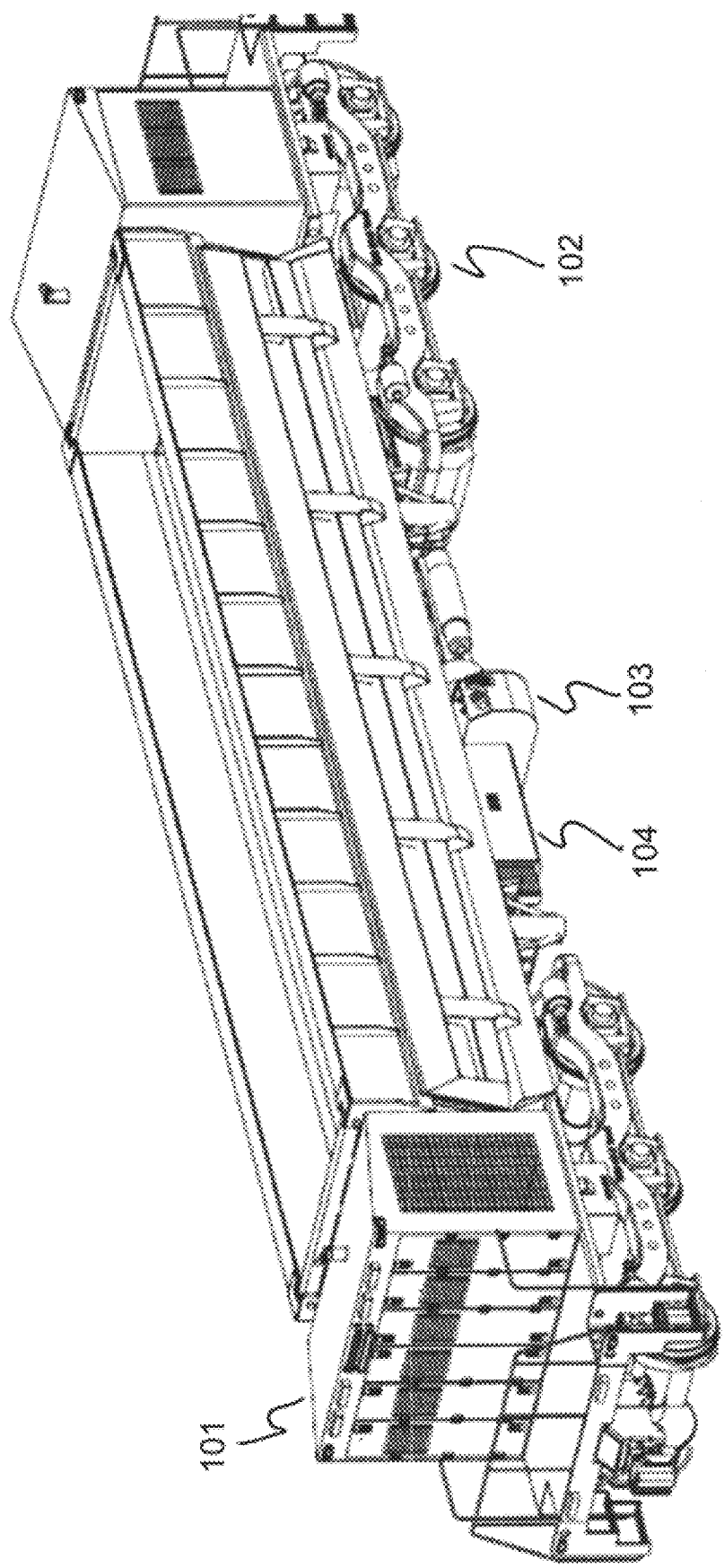
FIG. 1 is an isometric schematic of a prior art self-powered burden car using 3 axle locomotive trucks of U.S. Pat. No. 8,428,796.

FIG. 1 is an isometric view of a prior art self-powered burden car using 3 axle locomotive trucks 102 of U.S. Pat. No. 8,428,796. The burden car includes, gensets 101 and genset access platform at opposing ends of the car, a sensor array, battery box 104, fuel tank 103 and electrical cabinet.

One or more of the truck assemblies comprises two traction motors powered by the electrical energy produced by the genset.

Figure 2:
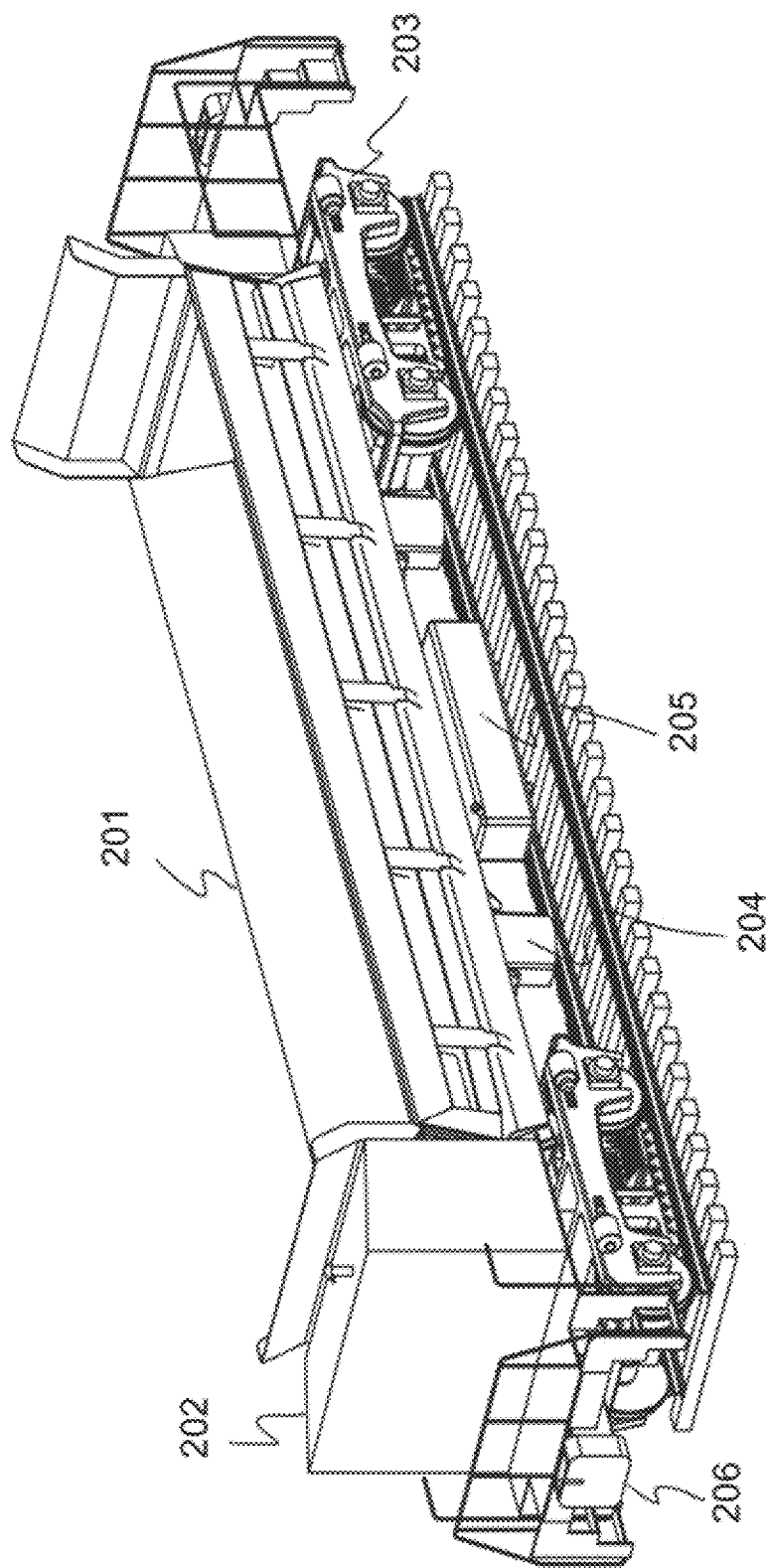
FIG. 2 is an isometric schematic view of an automated side dumping car of U.S. Pat. No. 8,428,796.

FIG. 2 is an isometric schematic view of an automated self-powered side dumping car according to the prior art. A cargo box 201 is attached to a frame which, in turn, is mounted on two truck assemblies 203. The cargo box 201 can be tilted for unloading by hydraulic or pneumatic cylinders 204 as shown further in FIG. 3. An engine or engines are located inside housing 202 and the engine or engines power one or both truck assemblies 203. A fuel tank 205 is also shown. The car has steel bumper/couplers 206 at either end. These allow cars to contact each other without damage and also allow cars to be coupled together using a steel plate coupling apparatus dropped into the slot on the steel bumpers 206. A side dumping car is loaded by depositing material such as ore into the top of the cars and is typically unloaded by tilting the body to one side as shown in FIG. 4. Each side dumping car includes an engine or engines and a drive system to power the car's axles. Examples of motive power drive options are given in FIG. 8. The wheels of these cars are typically 33-inches in diameter. These wheels can be replaced, if desired, by locomotive wheels which are 40-inches in diameter so as to increase adhesion of the driving wheels to the rails. All the axles of the self-powered side dumping car are powered so as to provide maximum traction to the rails for climbing steep grades in all types of weather. As can be appreciated, these cars can be lengthened and equipped with three or more trucks or the trucks may be one, two, three or four axle trucks.

Figure 3:
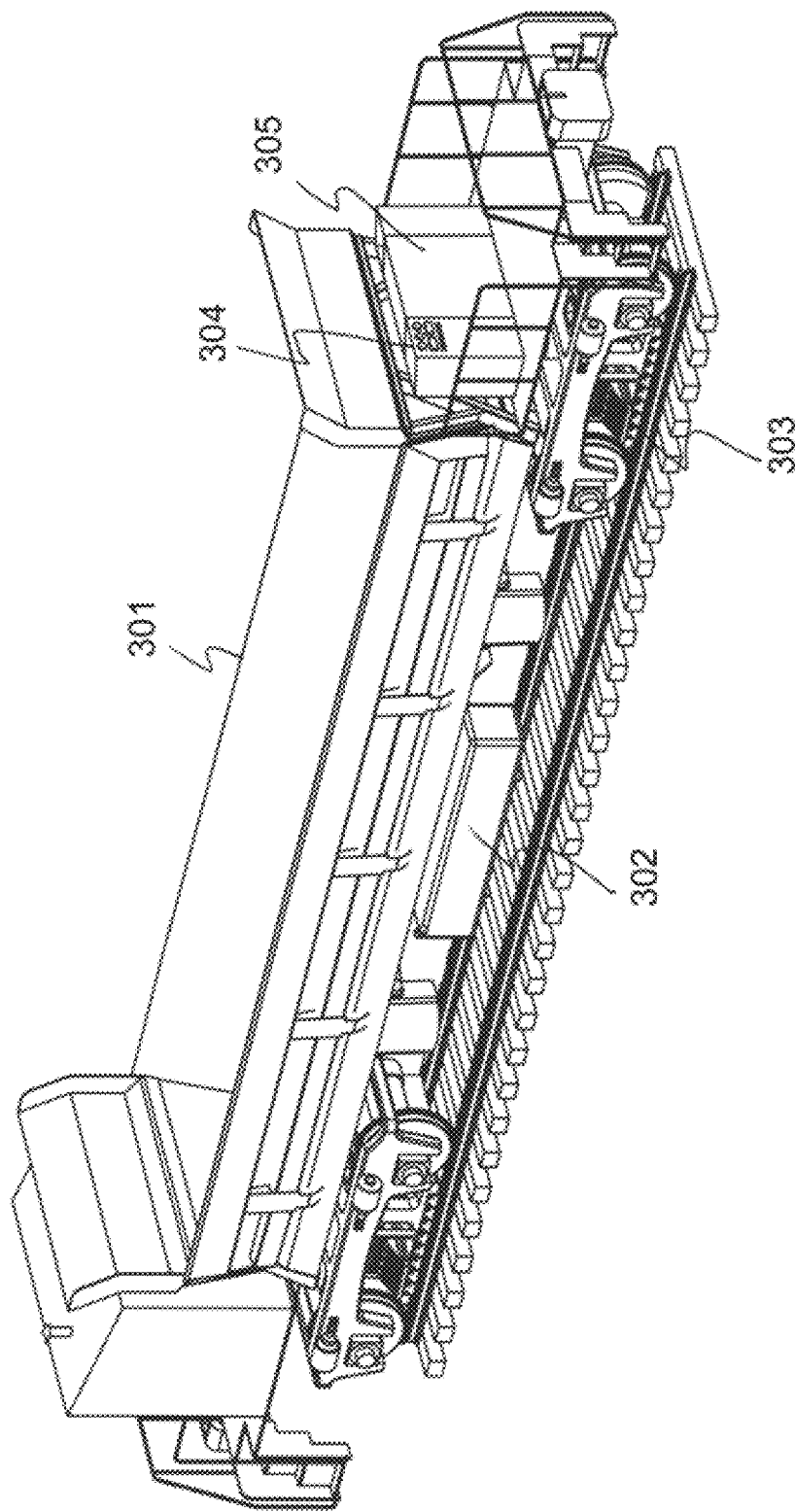
FIG. 3 is another isometric schematic view of an automated side dumping car of U.S. Pat. No. 8,428,796.
Figure 4:
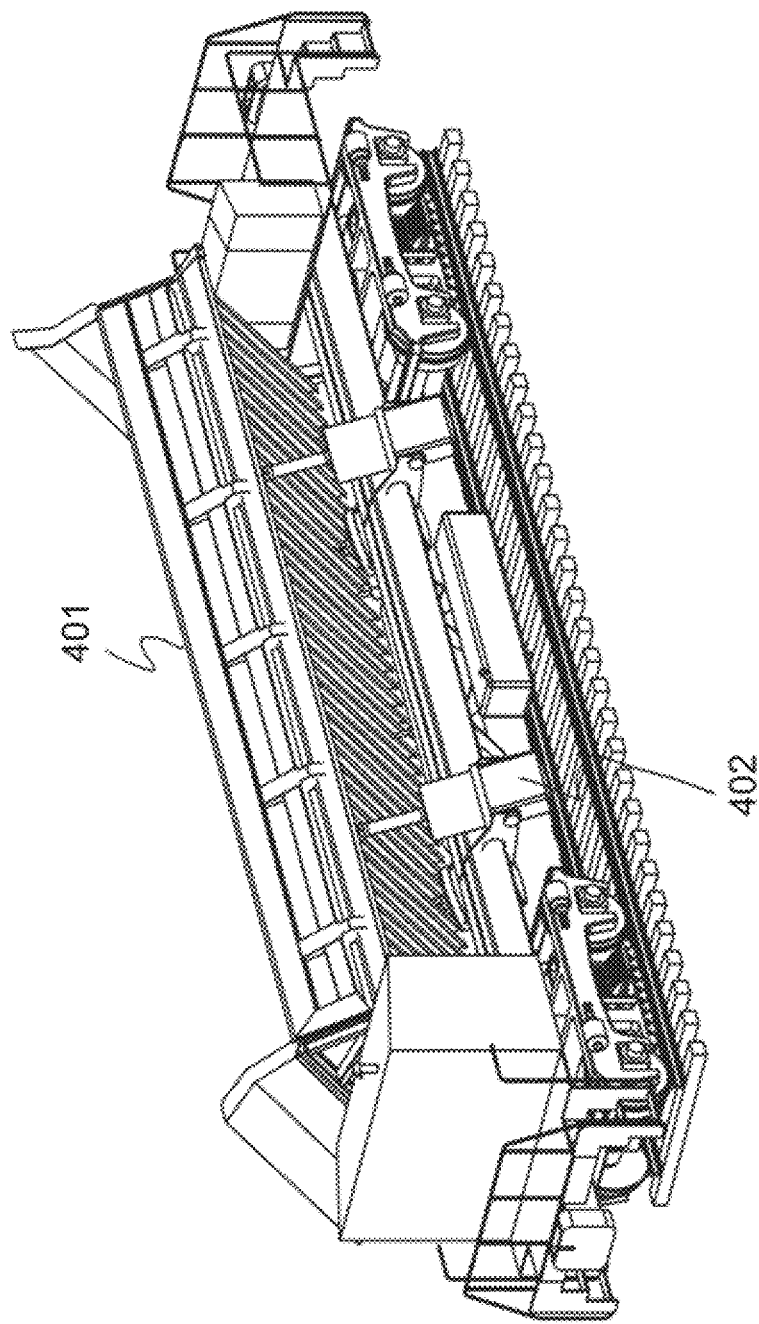
FIG. 4 is yet another isometric schematic view of an automated side dumping car of U.S. Pat. No. 8,428,796.

FIG. 3 is an alternate isometric schematic view of the self-powered automated side dumping car of FIG. 2. A cargo box 301 is attached to a frame which, in turn, is mounted on two truck assemblies. This view shows a dynamic brake apparatus in cabinet 305 and a separate cabinet 304 for power and control electronics as well as for communications apparatus. This view also shows a magnetic brake assembly 303, one for each of the two truck assemblies. Also shown is a fuel tank 302.

FIG. 4 is an isometric schematic view of an automated side dumping car with the cargo box 401 tilted for unloading. The cargo box 401 is tilted by hydraulic or pneumatic cylinders 402. Passive versions of these type of side dumping cars are made, for example, by JK-CO., LLC of Findlay Ohio.

Figure 5:
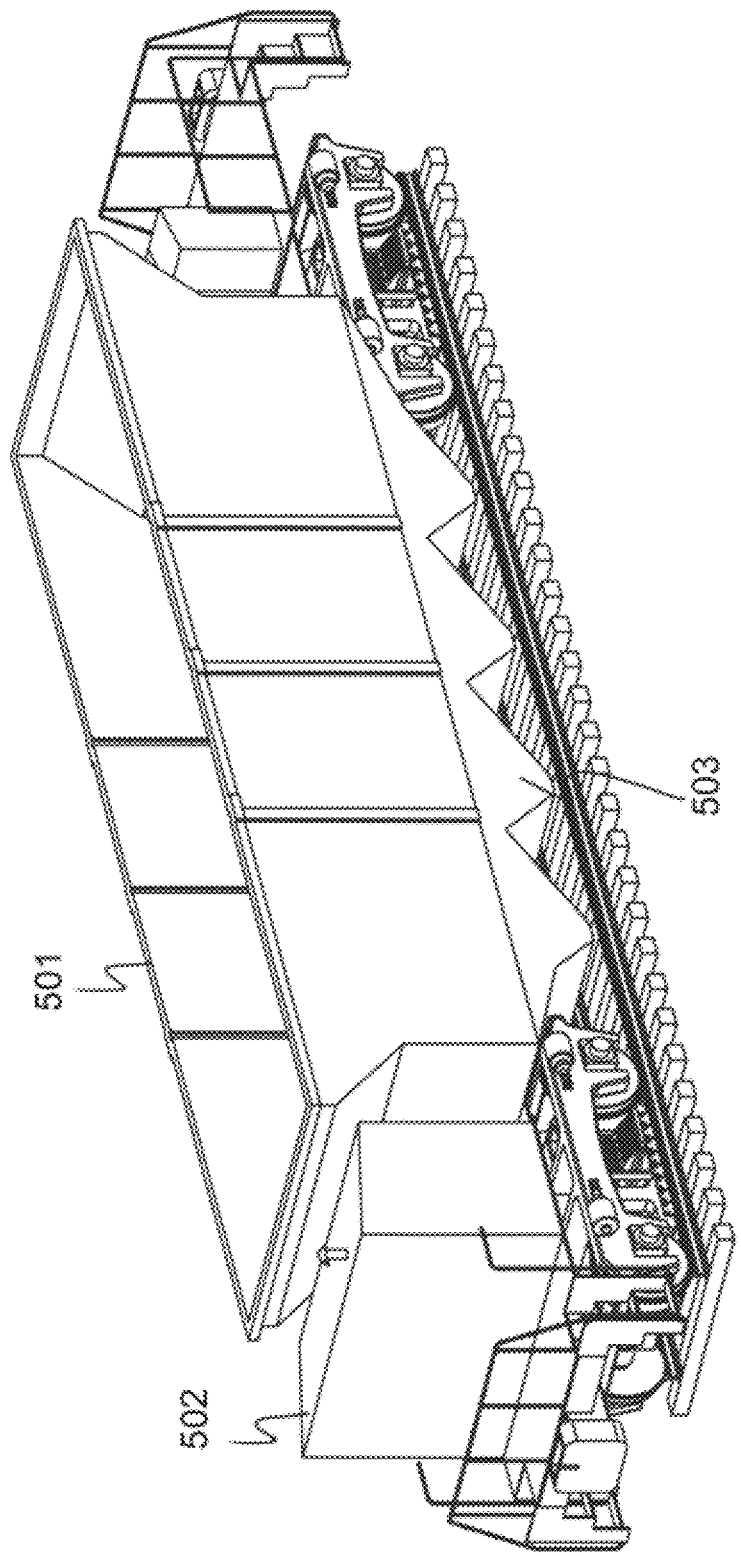
FIG. 5 is an isometric schematic view of an automated hopper car of U.S. Pat. No. 8,428,796.

FIG. 5 is an isometric schematic view of an automated hopper car according to another embodiment of the present invention. A cargo box 501 is shown mounted on two truck assemblies similar to those of the side dumping car of FIG. 2. One or both truck assemblies may be powered by an engine or engines located inside housing 502. A hopper cars is loaded by depositing material such as ore into the top of the cars and is unloaded by dropping the material through the bottom by opening hopper doors 503.

Figure 6:
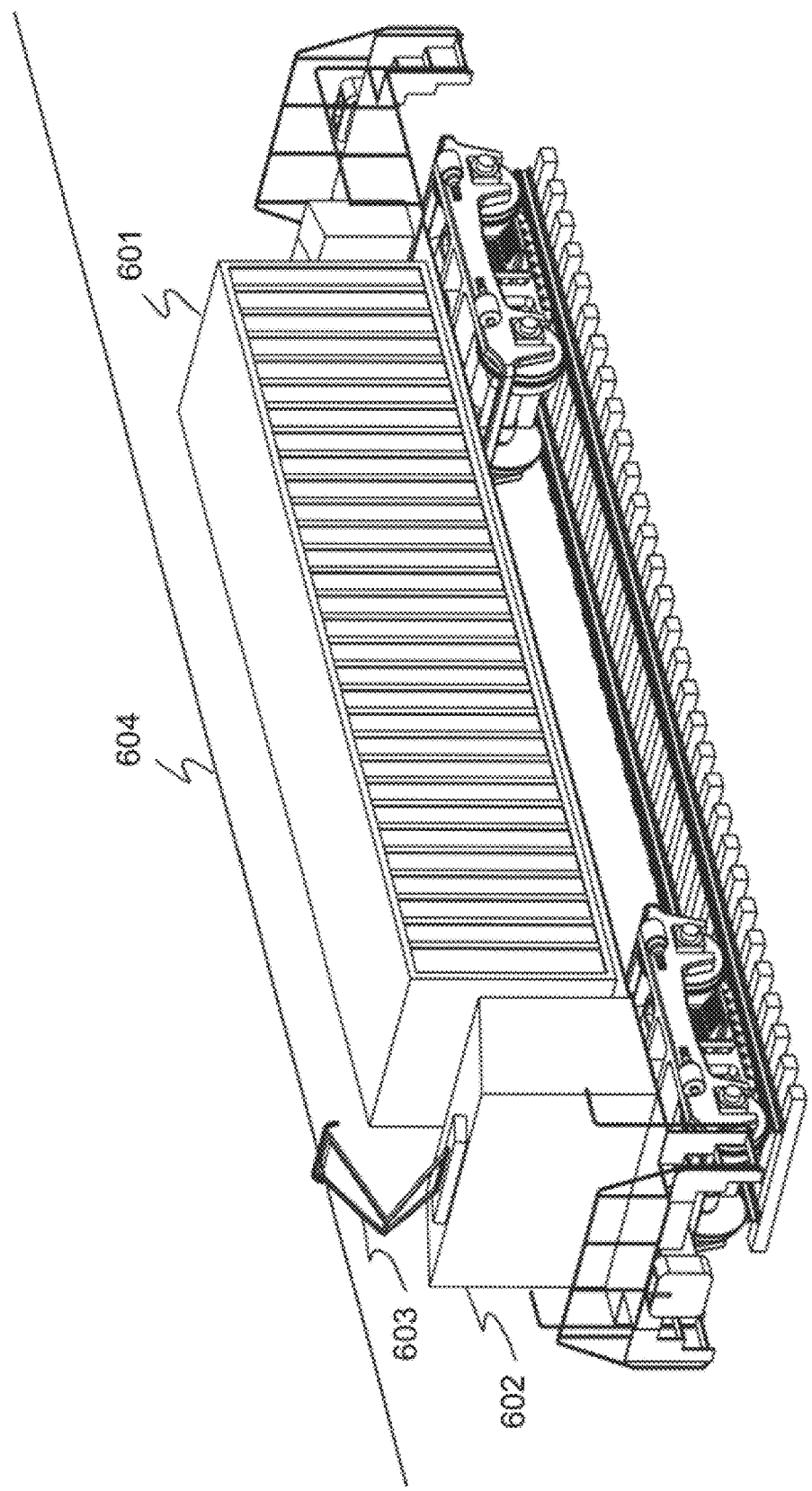
FIG. 6 is an isometric schematic view of an automated cargo container car of U.S. Pat. No. 8,428,796.

FIG. 6 is an isometric schematic view of a self-powered automated cargo container car according to yet another embodiment of the present invention. This car is similar to that of FIGS. 2 through 5 except that it has no cargo box but has a flat deck on which a cargo container 601 can be positioned and secured. The container car is also shown with a pantograph electrical pickup 603 which allows the car to be powered by overhead electrified wires 604. On-board energy storage may be provided by battery pack 602.

Figure 7A:
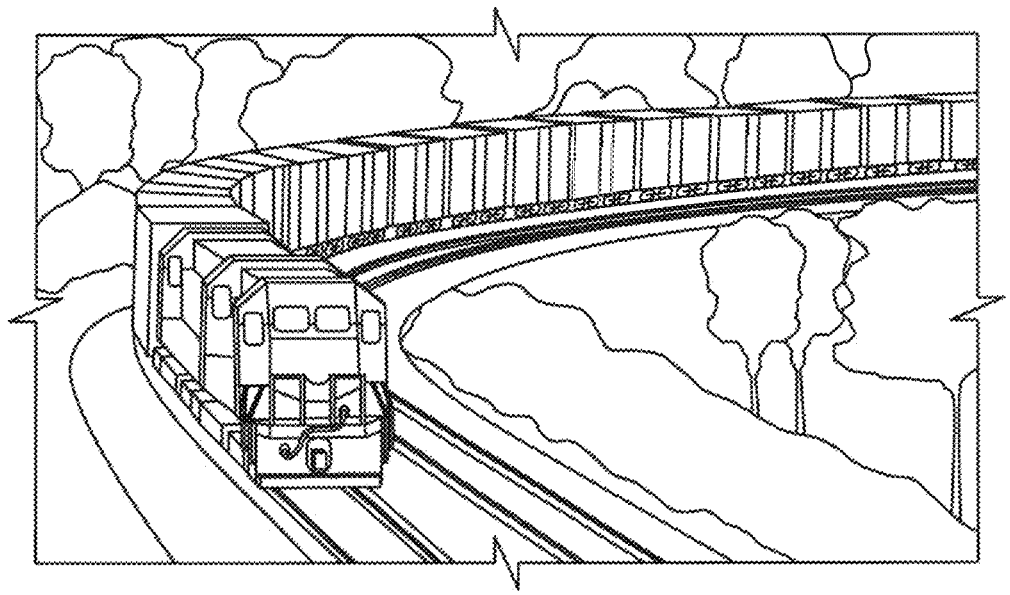
FIGS. 7a and b show prior art unit trains.
Figure 7B:
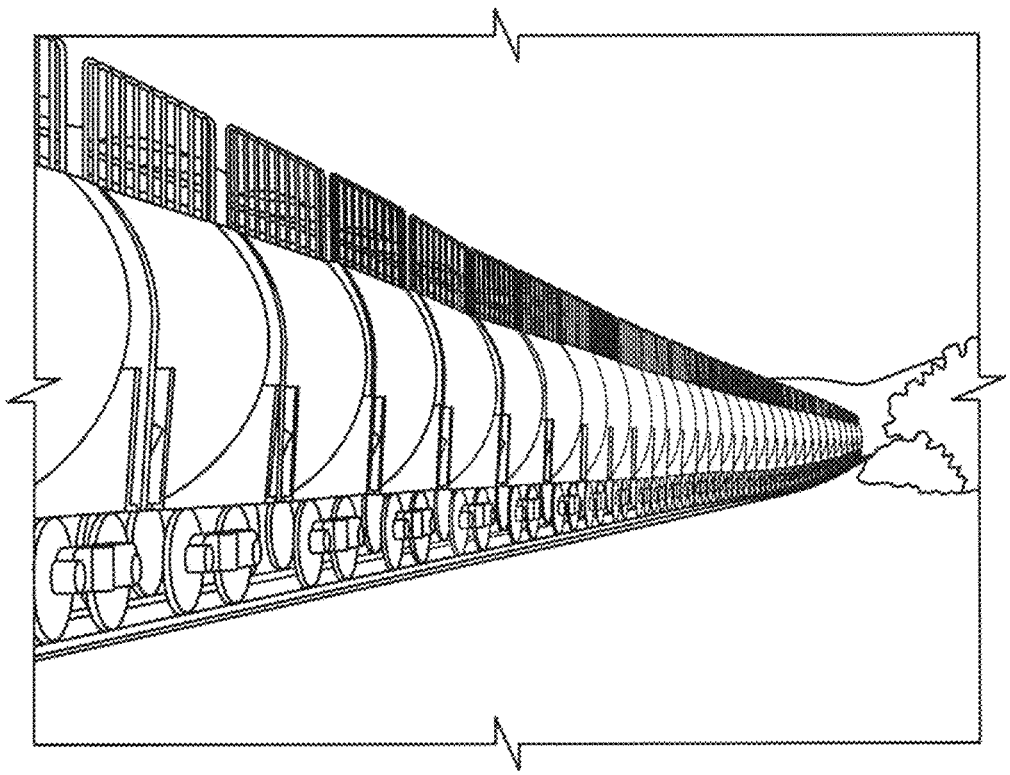

FIGS. 7a and b show prior art unit trains. FIG. 7a shows a unit train made up of container cars (flat cars with Sea containers). FIG. 7b shows a unit train made up of oil tanker cars.

Figure 8:
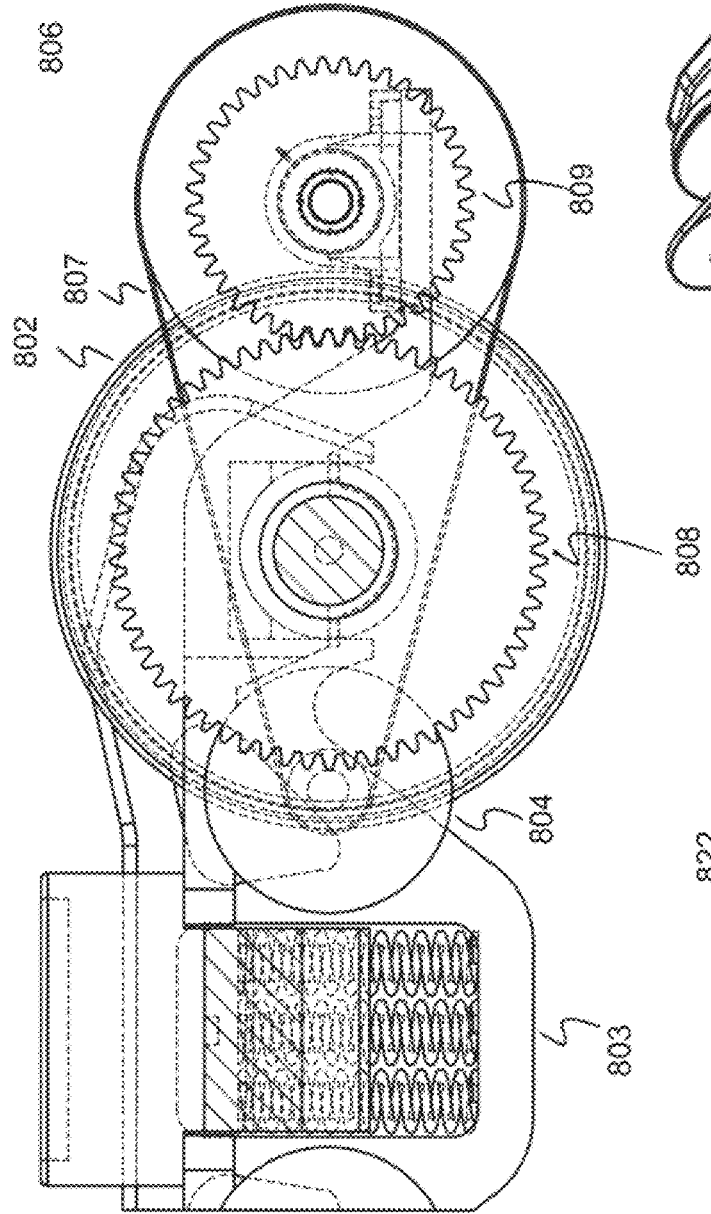
FIGS. 8a and 8c are sectional views and 8b an isometric view of a transmission for a prior art motorized freight car of U.S. Pat. No. 8,428,796.
Figure 8:
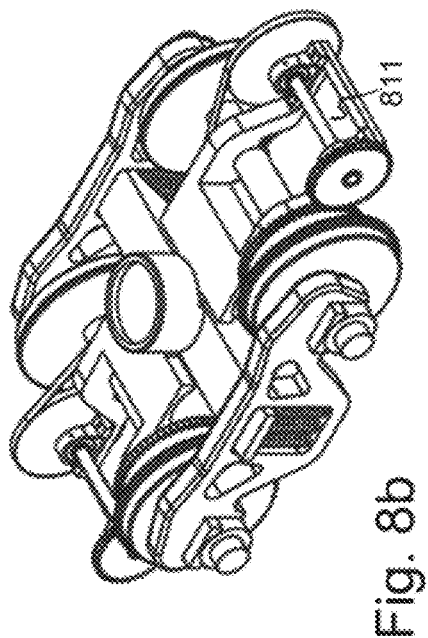
Figure 8:
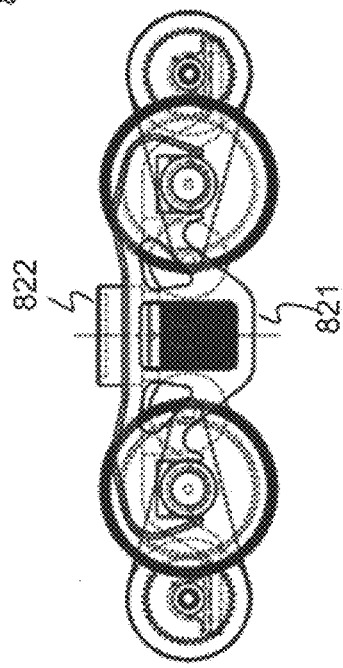

FIG. 8 is a schematic of a transmission for a motorized freight car of U.S. Pat. No. 8,428,796 showing belts and gears. FIG. 8a is a detailed side view of a modified freight car truck. FIG. 8b is an isometric view of a modified freight car truck and FIG. 8c is a side view of a modified freight car truck. In FIG. 8a, a traction motor 804 is attached to a frame 803. A sprocket on the shaft of traction motor 804 drives a synchronous belt 807 which drives a sprocket on jackshaft pulley assembly 806. Pinion gear 809 is attached to the shaft of jackshaft pulley assembly 806. Pinion gear 809 drives bull gear 808 which is mounted on the axle shaft of a 38-inch diameter flanged rail car wheel and Class G axle attached to a truck frame. Bull gear 808 is attached to rail car wheel 802. Jackshaft pulley assembly 806 transmits the drive force from synchronous belt 807 to pinion gear 809 and then to the bull gear 808 which powers rail car wheel 802.

An example of synchronous belt 807 is the carbon fiber Poly Chain GT Carbon Belt Drive made by the Gates Corporation. The synchronous belt may also be made of steel chain.

Side view FIG. 8c shows the frame 821 which includes bolster 822. Frame 821 forms the main truck body on which traction motors are suspended close to both axles.

In one configuration, a traction motor is attached to a frame and a sprocket on the shaft of the traction motor drives a synchronous belt which drives a pinion sprocket on a jackshaft assembly. The pinion gear attached to the shaft of the jackshaft assembly drives a bull gear which is mounted on the axle shaft of a rail car wheel. The jackshaft sprocket transmits the drive force from the synchronous belt to the pinion gear and then to the bull gear attached to the rail car wheel.

As shown in FIGS. 8 a to c, the truck assembly for a rail car includes:
a bolster assembly connected to side frames; two or three axles rotatably connected to the side frames, wherein at least one wheel is connected to the axle, and a space is formed between the axle and the bolster assembly; a traction motor connected to the bolster assembly and positioned in the space, wherein a shaft of the traction motor rotates about an axis that is parallel to an axis of the axles, and the shaft has a traction sprocket; a jackshaft assembly positioned outside of the space, the jackshaft assembly having a shaft with a jackshaft sprocket and a pinion gear, wherein the jackshaft sprocket has a larger diameter than the traction sprocket; a belt or chain connected to the traction sprocket and the jackshaft sprocket to transfer torque from the shaft of the traction motor to the shaft of the jackshaft assembly; and a bull gear connected to the axle and operably connected to the pinion gear. The bull gear has a larger diameter than the pinion gear whereby the pinion gear and the bull gear transfer torque from the shaft of the jackshaft assembly to the axle and the at least one wheel to propel the rail car

THE PRESENT DISCLOSURE

According to an embodiment of the disclosure, a truck assembly including one or more burden rail cars can comprise: an axle having opposing first and second wheels disposed at first and second ends of the axle, respectively, and a first bull gear positioned proximate to the second end, wherein the first and second wheels and the first bull gear are rigidly connected to the axle such that the first and second wheels and axle rotate in response to rotation of the first bull gear; a traction motor comprising an output shaft and an output pinion gear rigidly attached to the output shaft such that the output pinion gear rotates in response to rotation of the output shaft; and a lay shaft positioned between the first and second wheels, the lay shaft comprising a second bull gear rigidly connected to a first end of the lay shaft and a second pinion gear rigidly connected to an opposing second end of the lay shaft such that rotation of the second bull gear causes rotation of the lay shaft and the second pinion gear. The output pinion gear operably engages and drives the second bull gear and the second pinion gear operably engages and drives the first bull gear to transfer an input torque of the motor to an output torque of the axle.

The first bull gear can comprise a low speed bull gear, the second bull gear a high speed bull gear, and the second pinion gear a low speed pinion gear.

A diameter of the first bull gear can be larger than a diameter of the second bull gear, and the axle, output shaft, and lay shaft each can have a longitudinal axis of symmetry, with the longitudinal axes of symmetry being mutually parallel.

The output pinion gear, first bull gear, second bull gear, and second pinion gear can be located closer to the second wheel than to the first wheel.

The output pinion gear and second bull gear can be located nearer to the first wheel than the second wheel, and the second pinion gear and first bull gear can be located closer to the first wheel than the second wheel.

The motor and lay shaft can be removably connected to the axle to enable reprofiling or replacement of one or more of the first and second wheels.

The motor can be positioned between the second bull gear and second pinion gear.

The motor can be positioned between the first wheel on the one hand, first bull gear, second bull gear, and second pinion gear on the other hand.

According to an embodiment of the disclosure, a burden rail car can comprise:
- a structure for carrying cargo;
- a plurality of truck assemblies, each truck assembly comprising one or more axles;
- an on-board power source to provide propulsion power to at least one of the axles of each of the one or more burden rail cars;
- a traction motor comprising an output shaft and an output pinion gear rigidly attached to the output shaft such that the output pinion gear rotates in response to rotation of the output shaft; and
- a control interface operable to receive and process commands, and to execute selected functions, the selected functions comprising a plurality of start, brake, speed setting, gear setting, power source activation, power source deactivation, load cargo, and unload cargo.

A first truck assembly of the plurality of truck assemblies can comprise:
- an axle comprising opposing first and second wheels disposed at first and second ends of the axle, respectively, and a first bull gear positioned proximate to the second end, wherein the first and second wheels and the first bull gear are rigidly connected to the axle such that the first and second wheels and axle rotate in response to rotation of the first bull gear; and
- a lay shaft positioned between the first and second wheels, the lay shaft comprising a second bull gear rigidly connected to a first end of the lay shaft and a second pinion gear rigidly connected to an opposing second end of the lay shaft such that rotation of the second bull gear causes rotation of the lay shaft and the second pinion gear.

The output pinion gear can operably engage and drive the second bull gear and the second pinion gear can operably engage and drive the first bull gear to transfer an input torque of the motor to an output torque of the axle.

The on-board power source can be at least one of an engine, an energy storage system and a power grid current collector.

The power source can drive at least one of a generator, an alternator, and a hydraulic pump to power the traction motor.

A ratio of the number of driver axles to the number of total axles in the plurality of truck assemblies can be at least 0.167.

The structure for carrying cargo can be configured to carry at least approximately 20 tons.

The rail car can be configured to ascend, without wheel slippage, a grade of at least 10 degrees.

The commands can be received from at least one of a remotely located operator and computer, and the control interface can be configured to collect a plurality of measured parameters from on board sensors and provide the measured parameters to the at least one of the remote operator and computer. The measured parameters comprise engine temperature, fluid pressure, engine revolutions per minute, rail car speed, rail car acceleration, currently traversed grade, fuel level, and available stored energy. The control interface can be configured to collect at least one of still and video images of at least one of a portion of the rail car and an object near the rail car.

The burden rail car can further comprise a remotely located or on-board memory including an electronic representation of a section of a railway. The commands can be received from at least one of a remotely located and on-board processor executing automation logic. The remotely located and on-board processor can receive at least one of current location information from a satellite positioning system and a rail-side signal emitter. The at least one of the remotely located and on board processor, based on the current location information and electronic representation, can determine, from the automation logic, a value of the selected function. The electronic representation can comprise one of rail section length, rail section grade, rail section configuration, rail section type, speed setting, maximum emission level, identity of power source to be used, and distance to a destination.

A diameter of the first bull gear can be larger than a diameter of the second bull gear and the axle, output shaft, and lay shaft each have a longitudinal axis of symmetry and the axes of symmetry can be mutually parallel.

The output pinion gear, first bull gear, second bull gear, and second pinion gear can be located closer to the second wheel than to the first wheel, and the traction motor can be positioned between the first wheel on the one hand, first bull gear, second bull gear, and second pinion gear on the other hand.

The output pinion gear and second bull gear can be located nearer to the first wheel than the second wheel, the second pinion gear and first bull gear can be located closer to the first wheel than the second wheel, and the traction motor can be positioned between the second bull gear and second pinion gear.

The traction motor and lay shaft can be removably connected to the axle to enable reprofiling or replacement of one or more of the first and second wheels.

All of the axles of the one or more burden rail cars can be powered, and the burden rail car can include a gear box and a cardon shaft, the cardon shaft engaging the gear box and the at least one powered axle According to an embodiment of the disclosure, a method can comprise:
- providing a haulage railway having at least one loading point and at least one unloading point;
- providing a plurality of burden rail cars traversing the haulage railway, each of the burden rail cars comprising: a structure for carrying cargo; a plurality of truck assemblies, each truck assembly comprising one or more axles; an on board power source to provide propulsive power to at least one of the axles of the one or more burden rail cars; and a control interface operable to receive and process commands, to execute selected functions, wherein the commands are received from at least one of a remotely located operator, a remotely located computer, and an on board processor executing automation logic;
- loading each burden rail car with cargo at the at least one loading point;
- causing displacement of each loaded burden car along haulage railway by a traction motor providing output torque to an output pinion gear, whereby the output pinion gear operably engages and drives a second bull gear and a second pinion gear connected to the second bull gear and the second pinion gear operably engages and drives a first bull gear connected to an axle of a truck assembly to transfer an input torque of the motor to an output torque of the axle; and
- unloading, from each burden rail car, the cargo at the at least one unloading point.

The commands can be received from a remotely located operator.

The process can further comprise: collecting, by the control interface of a selected burden rail car, a plurality of measured parameters from on board sensors; collecting, by the control interface of the selected burden rail car, at least one of still and video images of at least one of a portion of the burden rail car and an object near the burden rail car; and providing, by the control interface of the selected burden rail car, the measured parameters to the remote operator, the measured parameters can comprise engine temperature, fluid pressure, engine revolutions per minute, speed, acceleration, currently traversed grade, fuel level, and available stored energy; position of electrical current collector apparatus; and receiving and processing, by the control interface of the selected burden rail car, commands from the operator.

A selected burden rail car can comprise at least one of a remotely located and on-board memory including an electronic representation of a section of a railway. For example, the electronic representation comprises one of rail section length, rail section grade, rail section configuration, rail section type, speed setting, maximum emission level, identity of power source to be used, and distance to a destination.

The commands can be received from an on board processor executing automation logic.

The process can further comprise: receiving, by the on board processor, at least one of current location information from a satellite positioning system and a rail-side signal emitter; determining, by the on board processor and based on the current location information and electronic representation, a value associated with the selected function; and inputting, by the on board processor, the value in the automated logic to generate a command. For example, a first value of the selected function can be automated state and a second value of the selected function can be one of manual and remote control state, the second value is selected when the one or more burden rail cars is engaged in one of cargo load and cargo unload operations.

The second value can be selected when the burden rail car is engaged in one of cargo load and cargo unload operations.

The first bull gear can comprise low speed bull gear, the second bull gear comprises a high speed bull gear, and the second pinion gear comprises a low speed pinion gear. A diameter of the first bull gear can be larger than a diameter of the second bull gear. The axle, output shaft, and lay shaft each have a longitudinal axis of symmetry and the axes of symmetry can be mutually parallel.

The output pinion gear, first bull gear, second bull gear, and second pinion gear can be located closer to a second wheel than to a first wheel on a common axle.

The traction motor can be positioned between the first wheel on the one hand, first bull gear, second bull gear, and second pinion gear on the other hand.

The output pinion gear and second bull gear can be located nearer to a first wheel than a second wheel, the first and second wheels being at opposing ends of a common axle. The second pinion gear and first bull gear can be located closer to the first wheel than the second wheel, and the traction motor can be positioned between the second bull gear and second pinion gear.

A lay shaft can be rigidly connected to the second bull gear and second pinion gear and the process can further comprise removing the traction motor and lay shaft from engagement with the first bull gear on an axle to enable reprofiling or replacement of one or more of wheels on the axle.

In one application, the railway is at least one of a raceway, a switchback, and a single track with turnouts to permit burden rail cars to move back and forth between the loading and unloading points, wherein the cargo is excavated material, wherein a mine face near the loading point moves, wherein the railway comprises panel track section, and wherein the panel track is reconfigured to maintain the loading point in spatial proximity to the mine face as the mine face moves.

In one application, the railway is at least one of a raceway, a switchback, and a single track with turnouts to permit rail cars to move back and forth between the loading and unloading points, wherein the railway has at least one section with a grade of at least 10 degrees, wherein the railway comprises a plurality of switchbacks, each switchback comprising a spur to permit at least two burden rail cars to park on the spur while a loaded burden rail car ascends the railway.

In one application, the loading point is nearby a ship docking facility and the unloading point is nearby a rubber tired truck loading facility or a railroad terminus and wherein the railway is a loop to permit burden rail cars to move back and forth between the loading and unloading points without emissions.

In one application, the burden rail cars are at least one of remotely operated and automated along at least most of a first section of the railway, the first section extending between the loading and unloading points, and wherein the burden rail cars are at least one of manually and remotely operated at each of the loading and unloading points.

Figure 9C:

FIGS. 9a to c are schematics of three types of consists envisioned by the present disclosure. A consist can be formed by a single powered freight car (FIG. 9a); it can be formed by a powered freight car and one of more unpowered freight cars (FIG. 9b; or it can be formed by more than one powered freight car and more than one unpowered freight car (FIG. 9c). Generally, a consist as envisioned herein is not more than about 30 cars long.

Figure 10:
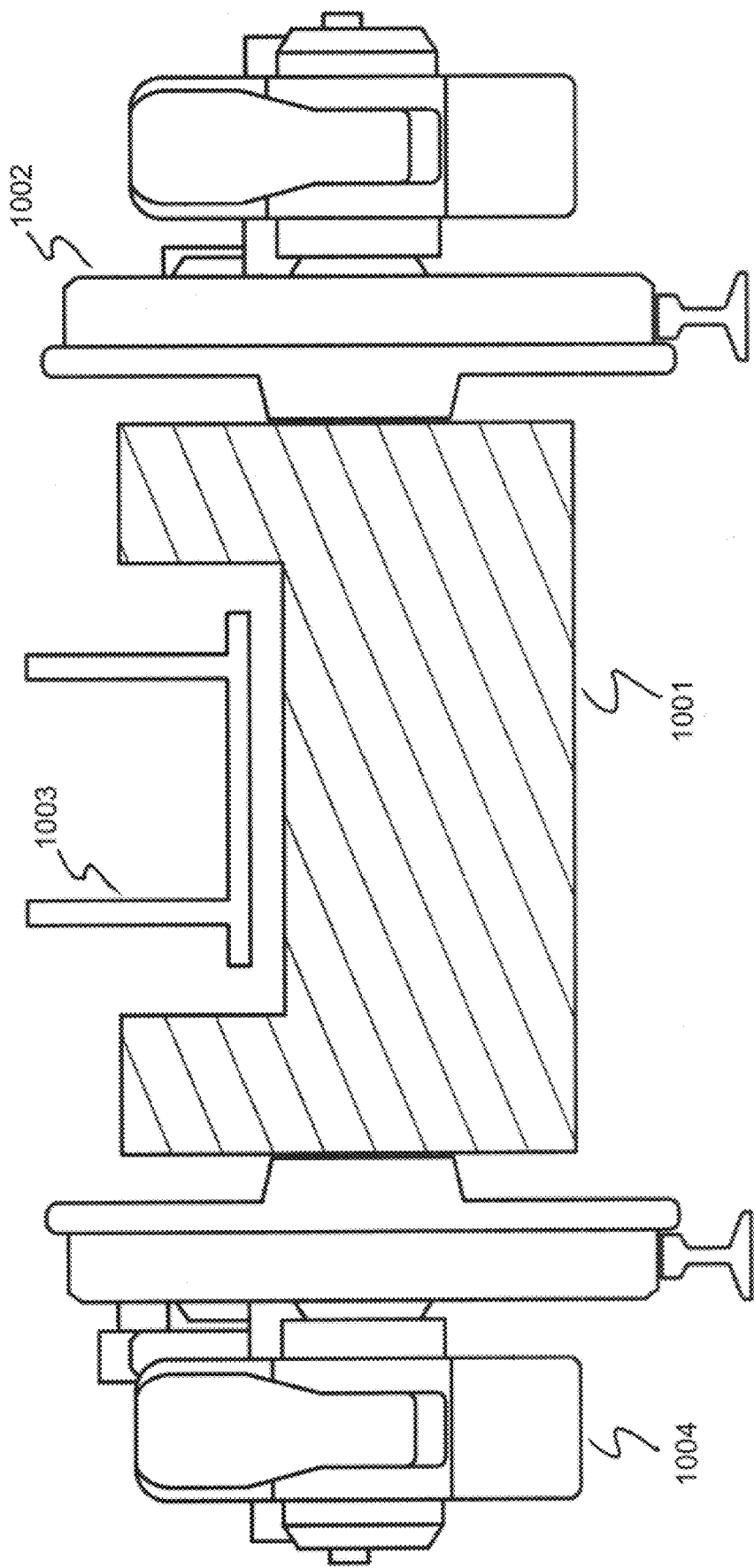
FIG. 10 is a schematic of a truck assembly illustrating the cross-sectional area that the traction motor, traction motor output gear, bull gear are housed.

FIG. 10 is a schematic of a truck assembly illustrating the cross-sectional area 1001 (hatched) that the traction motor, traction motor output gear, bull gear are housed for the motorized freight car of present disclosure. The rail car wheels 1002, the journal bearing assemblies 1004 and center sill are also shown.

Figure 11:
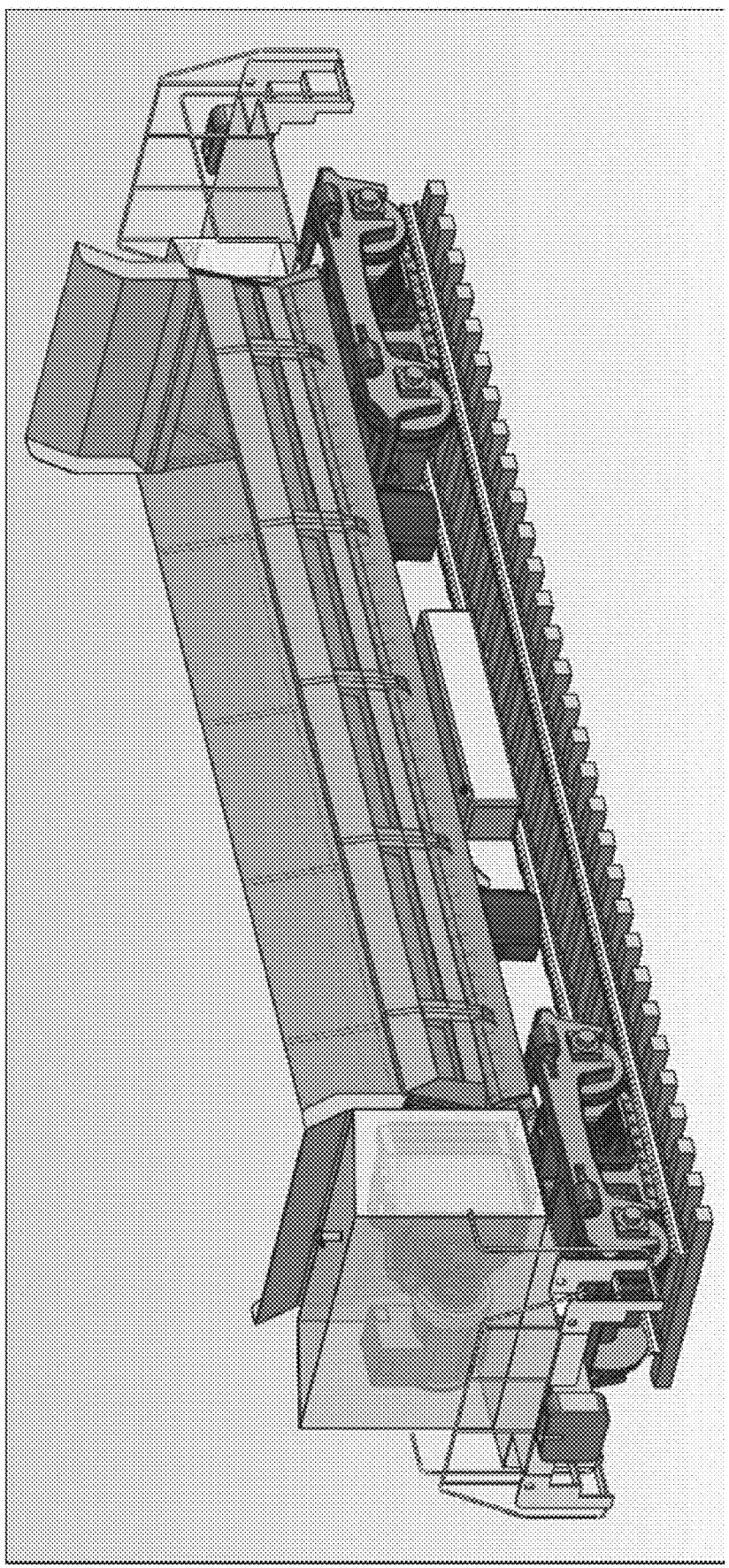
FIG. 11 is a schematic of an energy storage battery and fuel tanks under a self-powered rail burden car.

FIG. 11 is a schematic of an energy storage battery and fuel tanks under a self-powered rail freight car. The body of the rail freight car shown is a side dumping body such as shown in FIG. 4. An energy storage battery pack or a fuel tank may be mounted under the body between the two truck assemblies and be attached to the longitudinal box or I-beam that connects the two truck assemblies.

Figure 12:
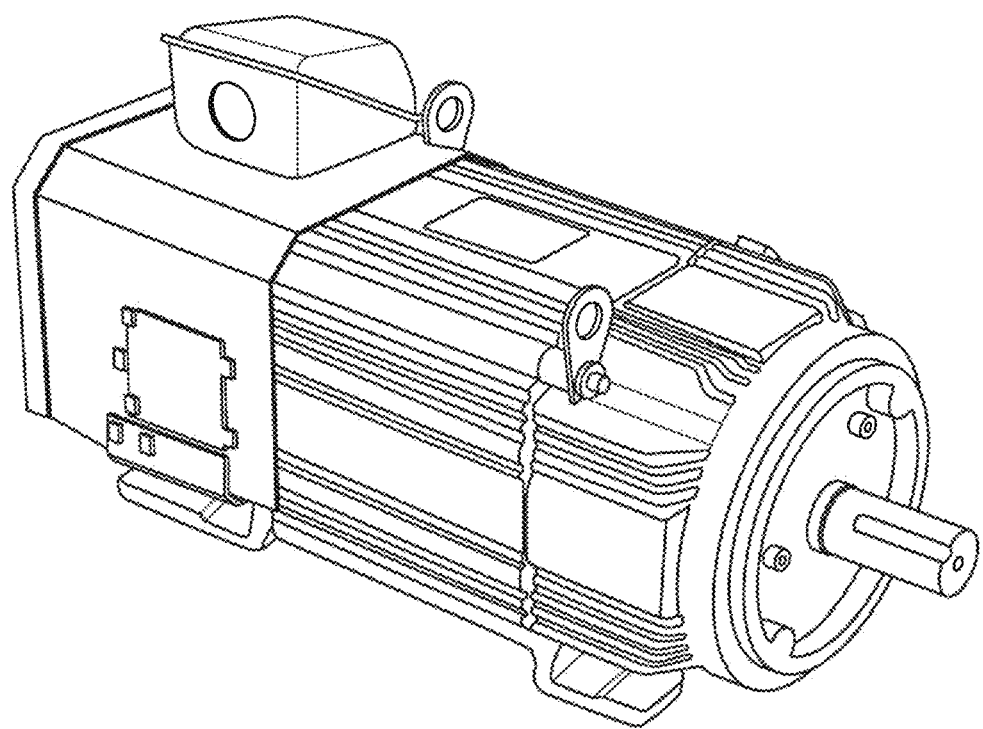
FIG. 12 is an example of a compact AC traction motor.

FIG. 12 is an example of a compact AC traction motor that is suitable for the powered rail freight car of the present disclosure. This is an example of an AC traction motor that can replace a physically larger locomotive DC traction motor because of its higher operating speed (e.g., having a maximum safe speed of at least about 3,000 rpm, a continuous torque of at least 4,500 Nm @ 520 A and more typically of at least about 5,000 Nm @ 520 A, and a peak torque of at least about 9,000 Nm @ 1,100 A and more typically of at least 10,000 Nm @ 1,100 A) used in conjunction with a higher gear reduction ratio between the traction motor and wheel axle (e.g., a gear ratio of at least about 55:15 and more typically of at least about 62:15). This AC traction motor and its gear train can be fitted into the truck with minimal mechanical alteration to the truck assembly. This type of motor can be liquid cooled or cooled with forced air. As will be appreciated, other traction motors may be employed depending on the application.

Figure 13:
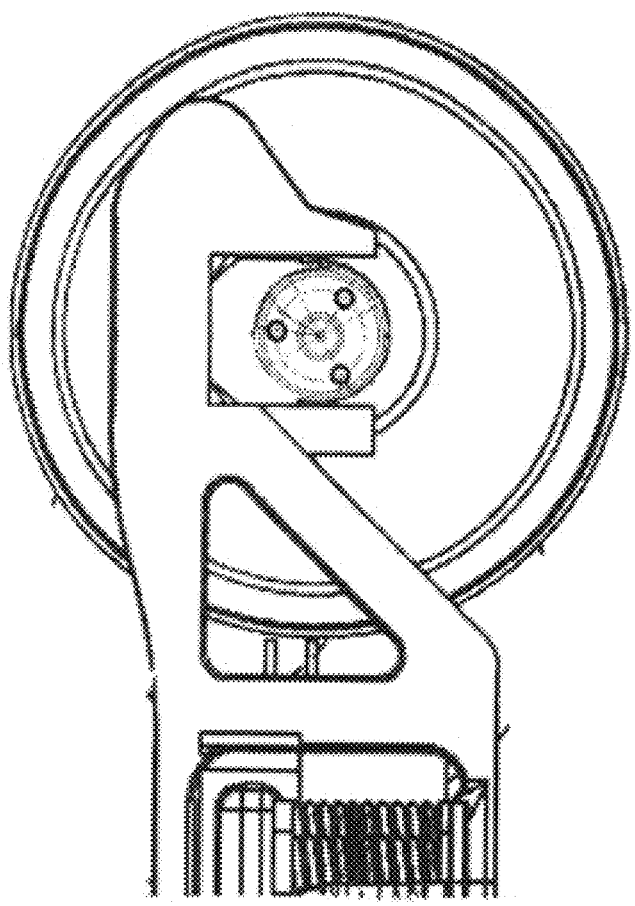
FIG. 13 is a cross-sectional schematic of another possible transmission for the motorized freight car of present disclosure.
Figure 13:
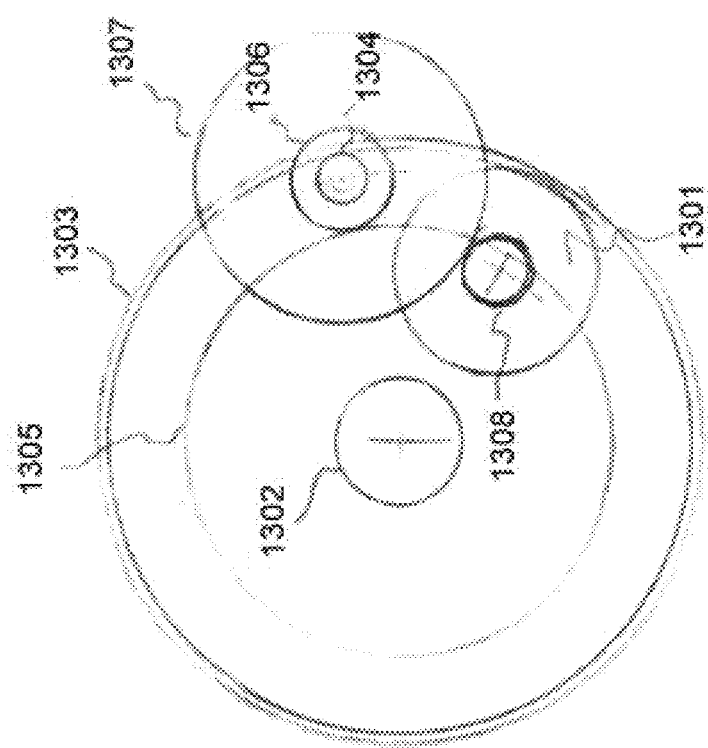

FIG. 13 is a schematic of another possible transmission for the motorized freight car of present disclosure. FIG. 13 illustrates a preferable gear arrangement for the motorized freight truck of the present disclosure. A traction motor 1301 turns a high speed pinion 1308 that rotatably drives a high speed bull gear 1307 attached to one end of a lay shaft 1304. A low speed pinion gear 1306 attached rigidly to the other end of lay shaft 1304 rotatably drives an axle mounted bull gear 1305. The axle 1302 connects two rail car wheels 1303. The high speed bull gear 1307 and the larger diameter axle mounted bull gear 1305 are shown on opposite sides of the truck assembly. This design removes the high speed bull gear 1307 as far as possible from the box beam on which the rail car body is mounted and, as a result, there is no interference between the two bull gears and the box beam when the truck assembly transits a curved section of rail.

Figure 14:
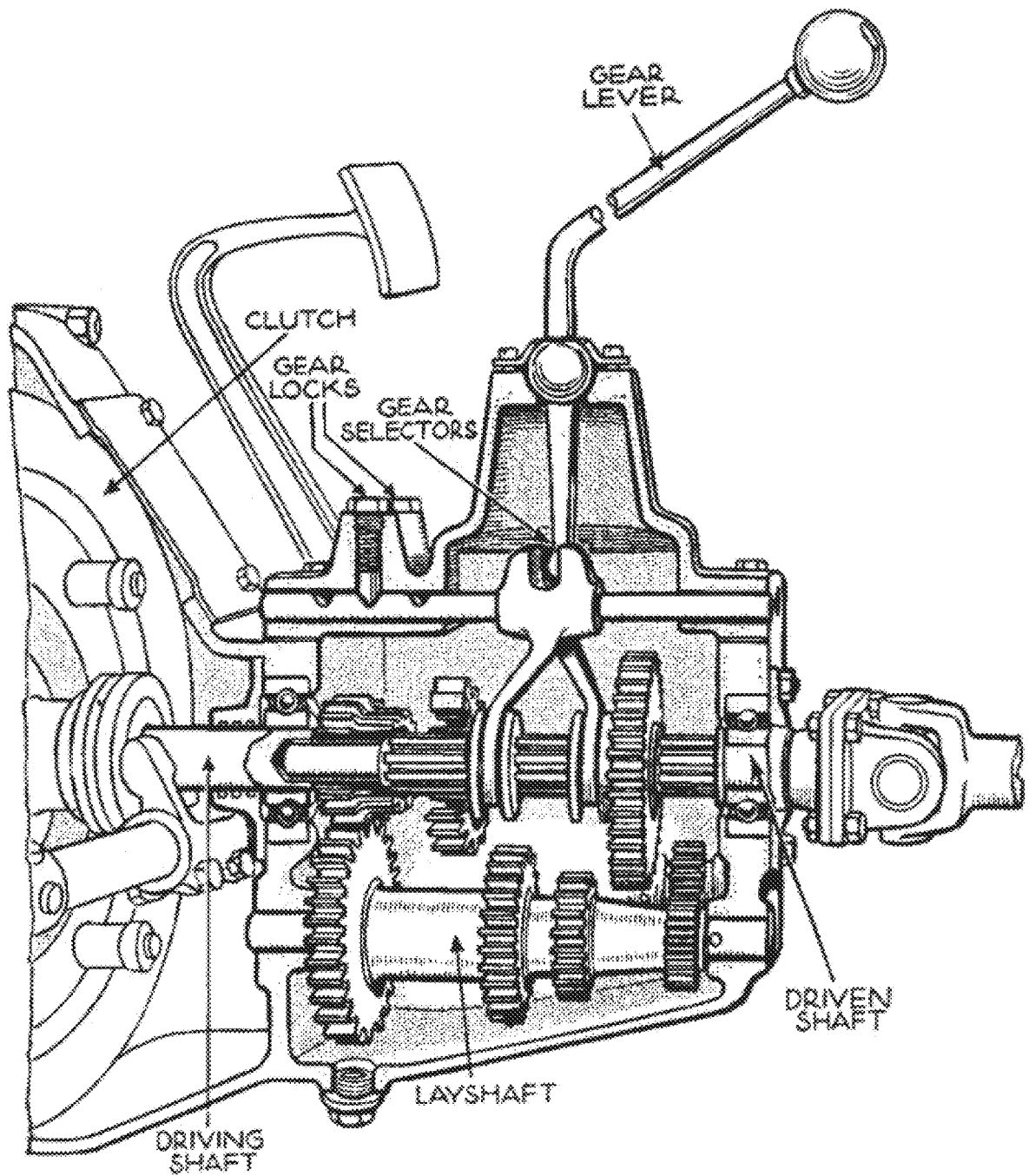
FIG. 14 is a cut-away schematic of a prior art layshaft.

FIG. 14 is a schematic of a prior art layshaft that can be employed by the various embodiments of the present disclosure. A layshaft is an intermediate shaft within a gearbox that carries gears, but does not transfer the primary drive of the gearbox either in or out of the gearbox. The driving shaft carries the input power into the gearbox. The driven shaft is the output shaft from the gearbox.

Figure 15:
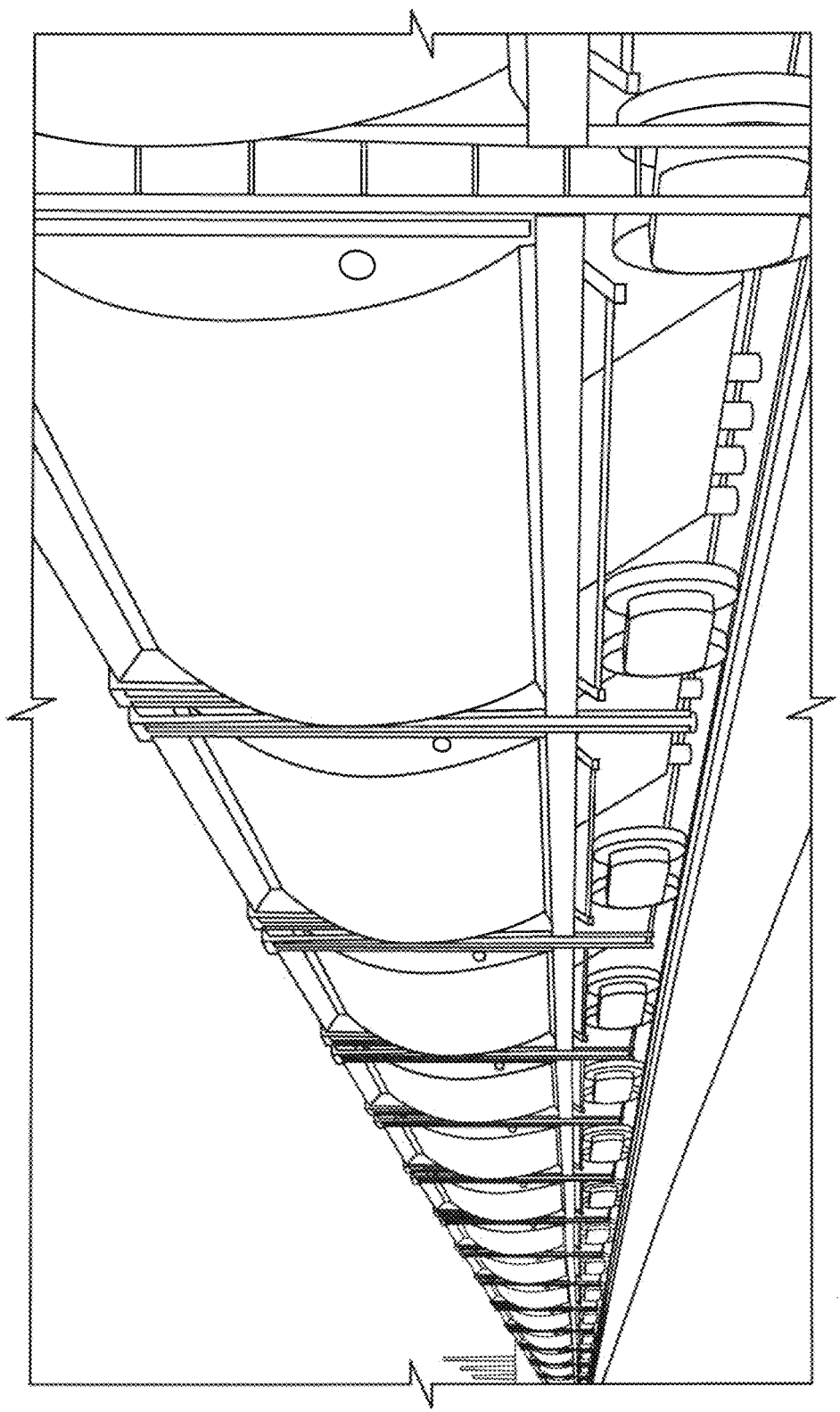
FIG. 15 shows a prior art grain train.

FIG. 15 shows a prior art grain train. This is a unit train that gathers grain from grain elevators located along its route (its sources) and transports the grain to a processing facility (its destination). Processing facilities include flour mills, ethanol plants, corn sweetener plants and the like. A grain train can be 100 plus grain cars long.

Figure 16:
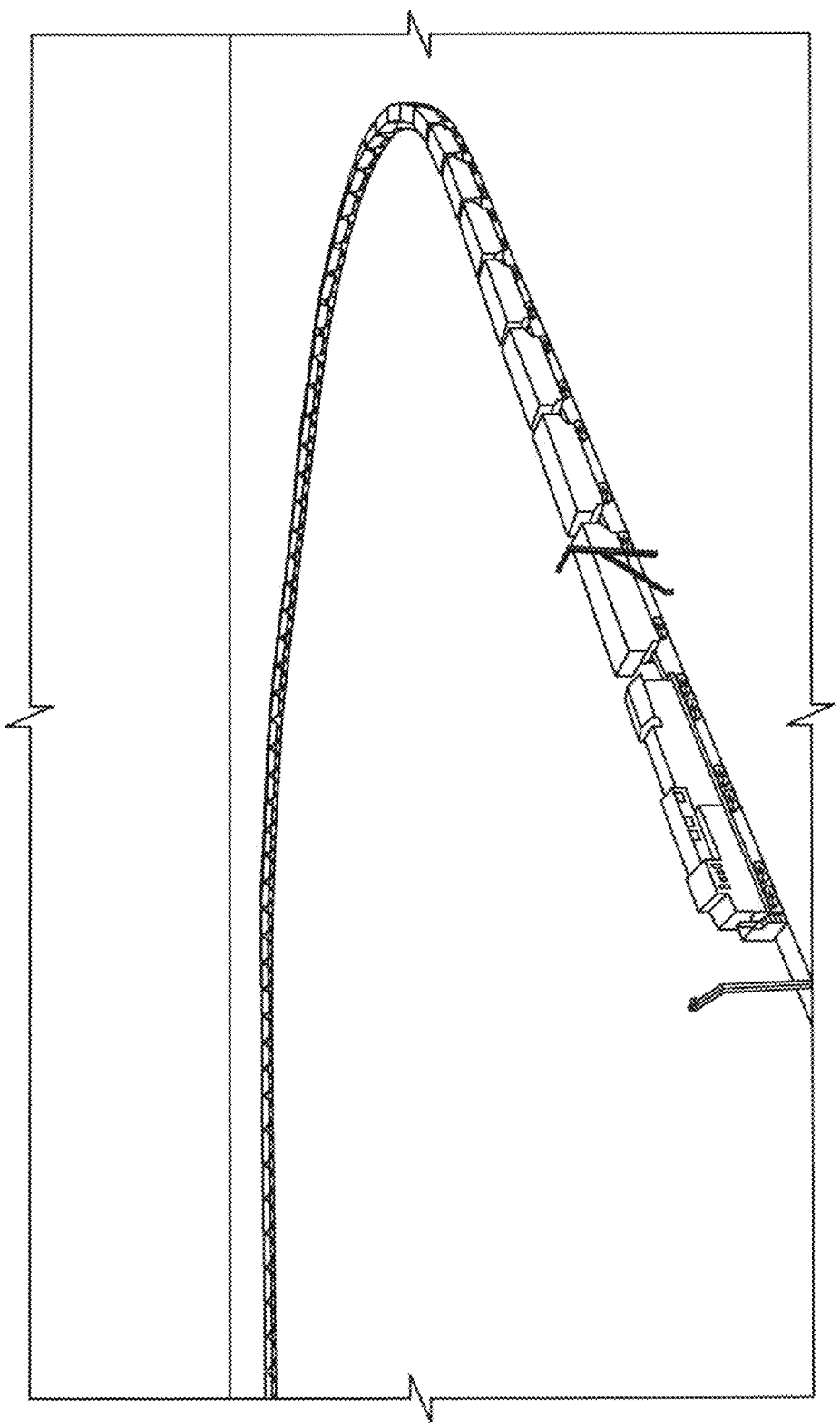
FIG. 16 shows a long prior art unit train that can transport, for example, grain or potash in covered hopper cars.

FIG. 16 shows a long prior art unit train that can transport, for example, grain or potash in covered hopper cars.

Figure 17:
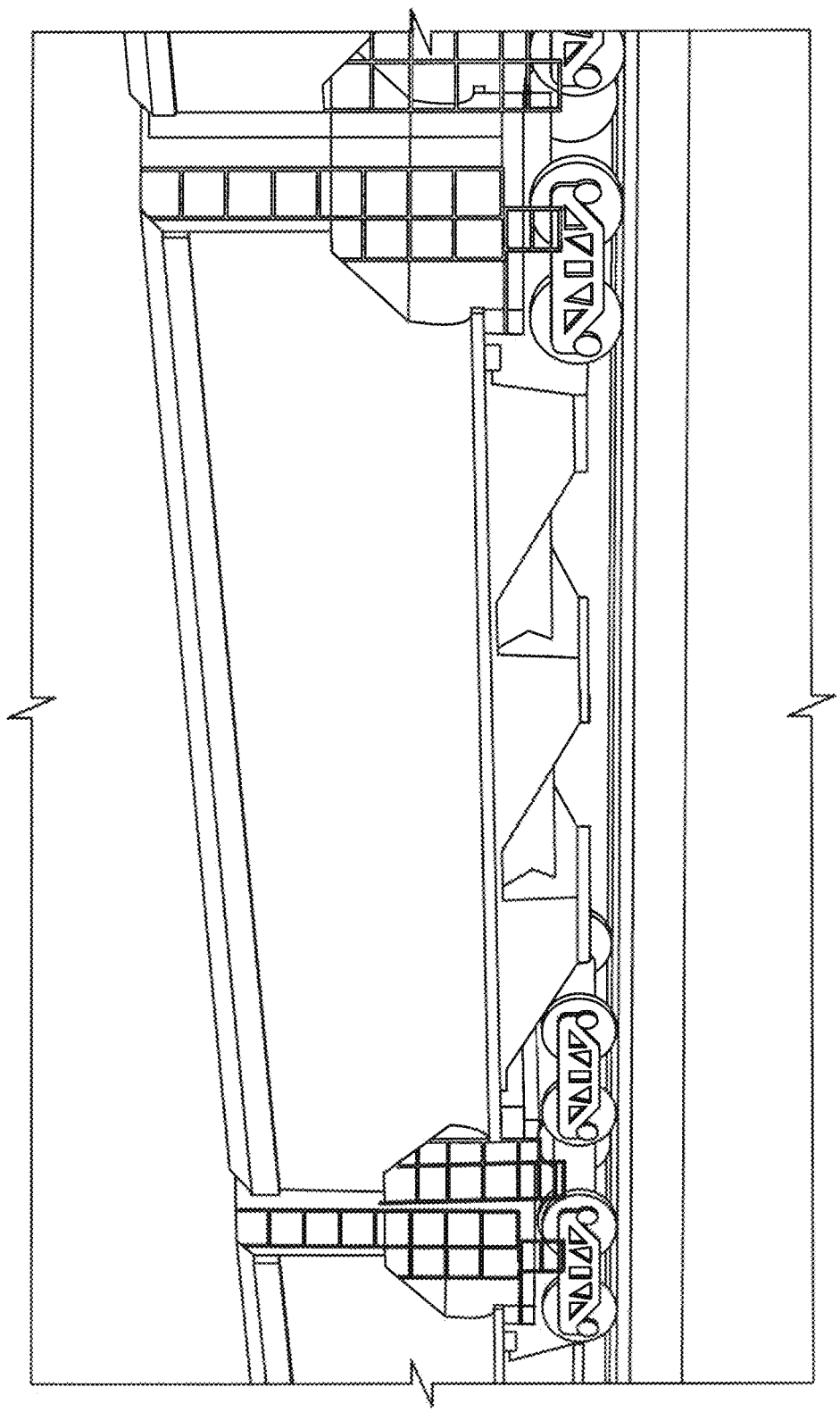
FIG. 17 shows prior art hopper grain cars.

FIG. 17 shows prior art grain or potash hopper cars.

Figure 18:
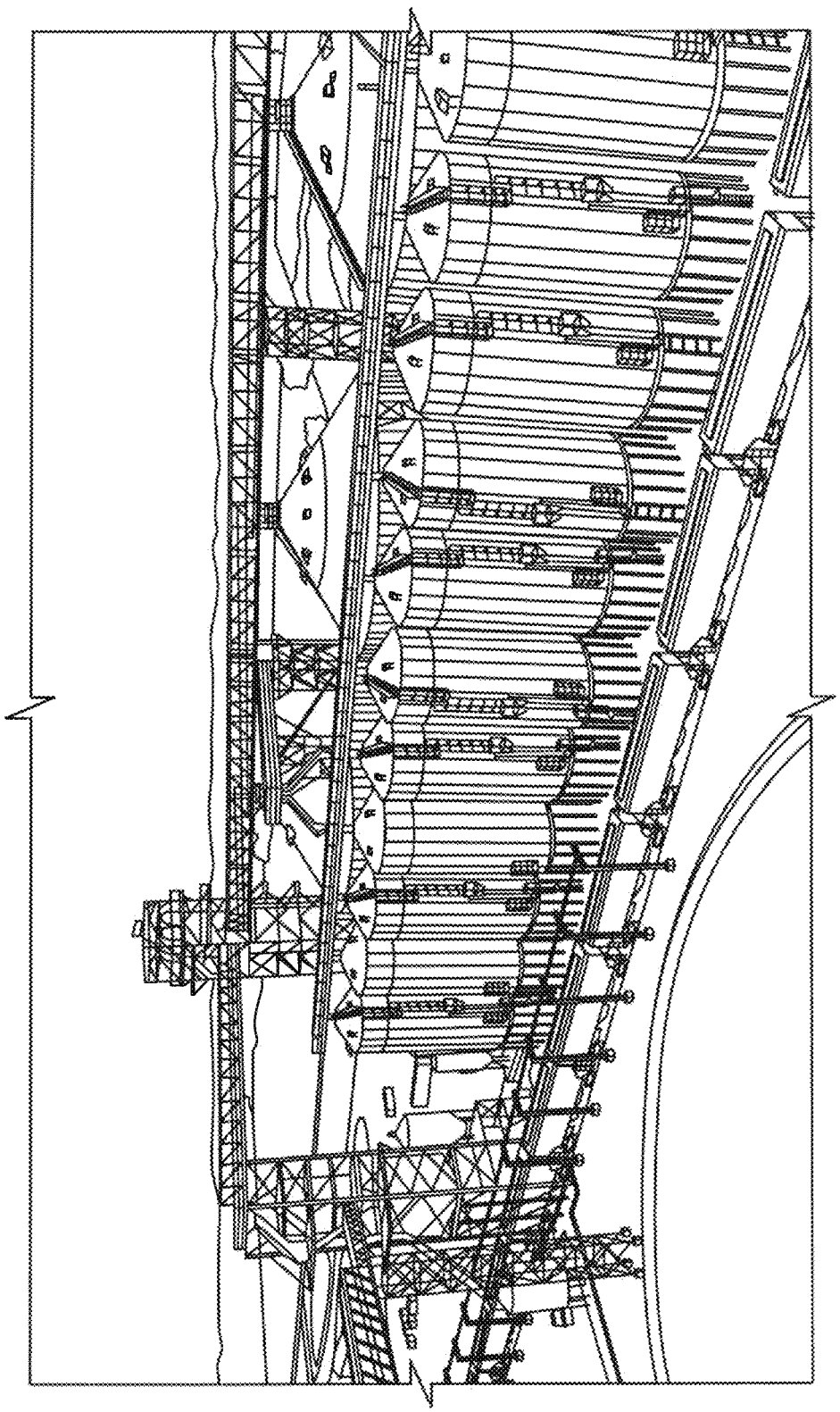
FIG. 18 shows a prior art loading facility for hopper grain cars.

FIG. 18 shows a prior art loading facility for hopper grain cars. Here a long unit grain train is being loaded as it passes the grain elevators.

Figure 19:
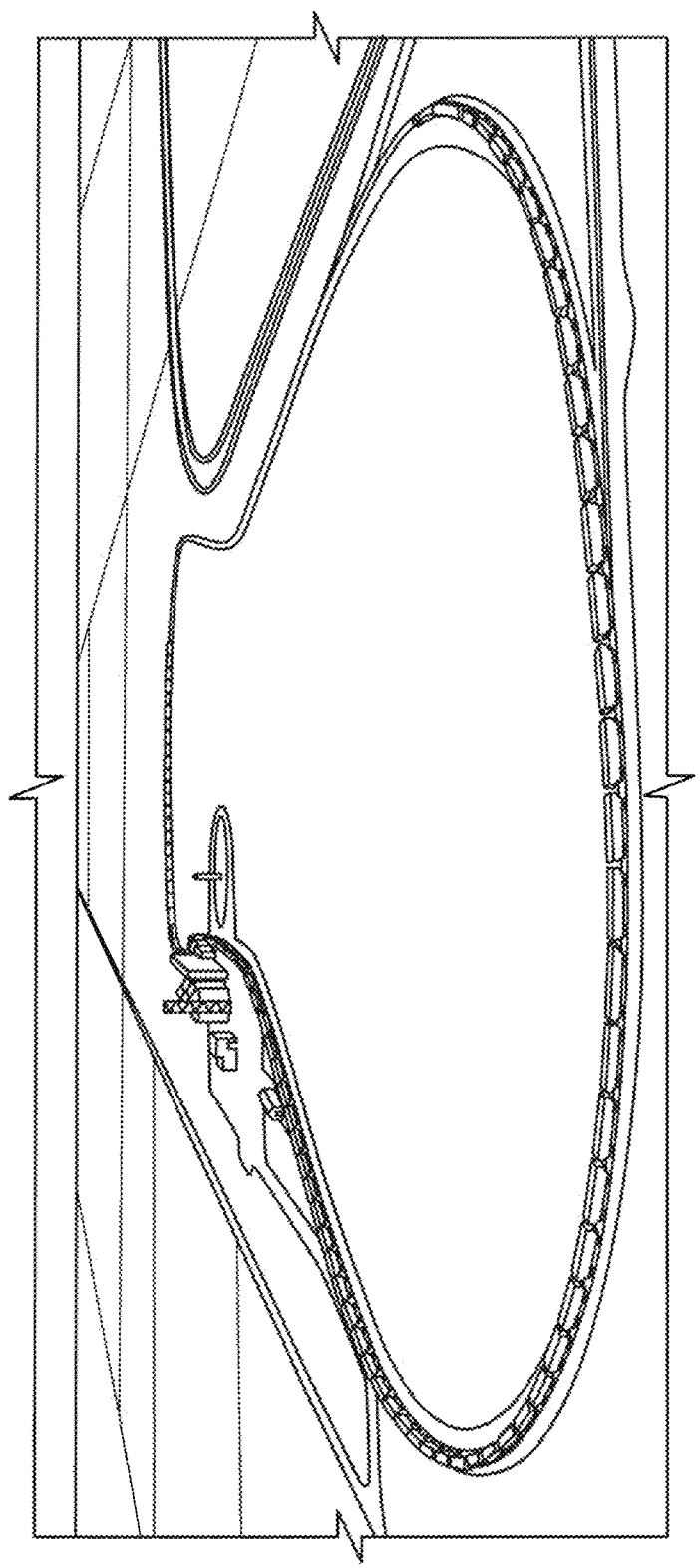
FIG. 19 shows a prior art track loop for a unit grain cars.

FIG. 19 shows a prior art track loop for a unit grain cars. Here a long unit grain train enters the rail loop (at the lower right side of the figure) and, as it passes the grain elevators (top left side of the figure), its hopper cars are loaded with grain. The train exits the loop (top right side of the figure) and continues on to its destination. Grain is loaded into the elevators by grain haul trucks which access the elevator bank its the right side, opposite where the grain hopper cars are loaded.

Figure 20:
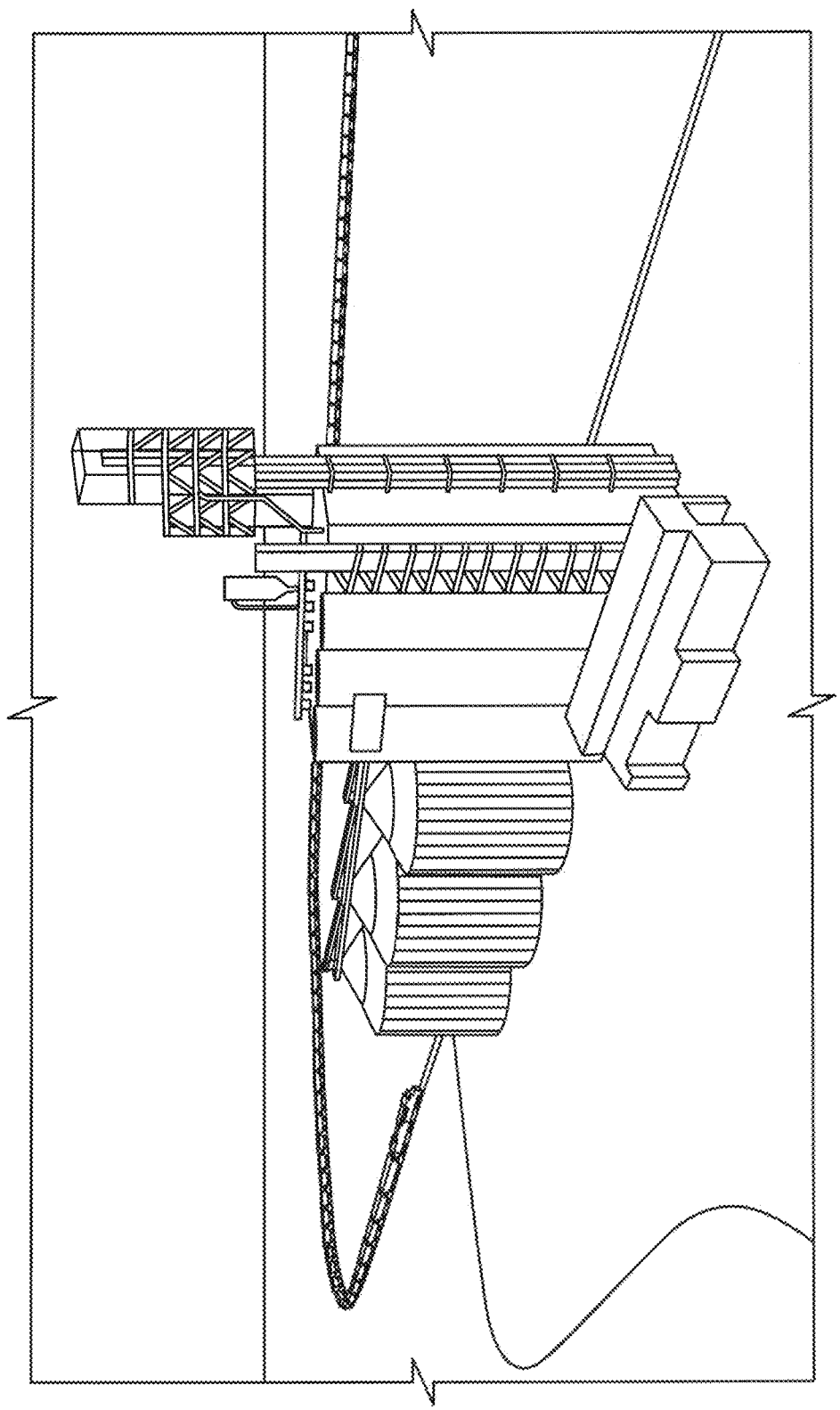
FIG. 20 shows another prior art track loop for unit grain cars.

FIG. 20 shows another prior art track loop for a unit grain train. The grain train is approaching the bank of grain elevators and will be loaded on the far side of the elevators. Grain haul trucks bring grain to the elevators and transfer their grain to the elevators in the building on the near side of the elevators.

Figure 21:
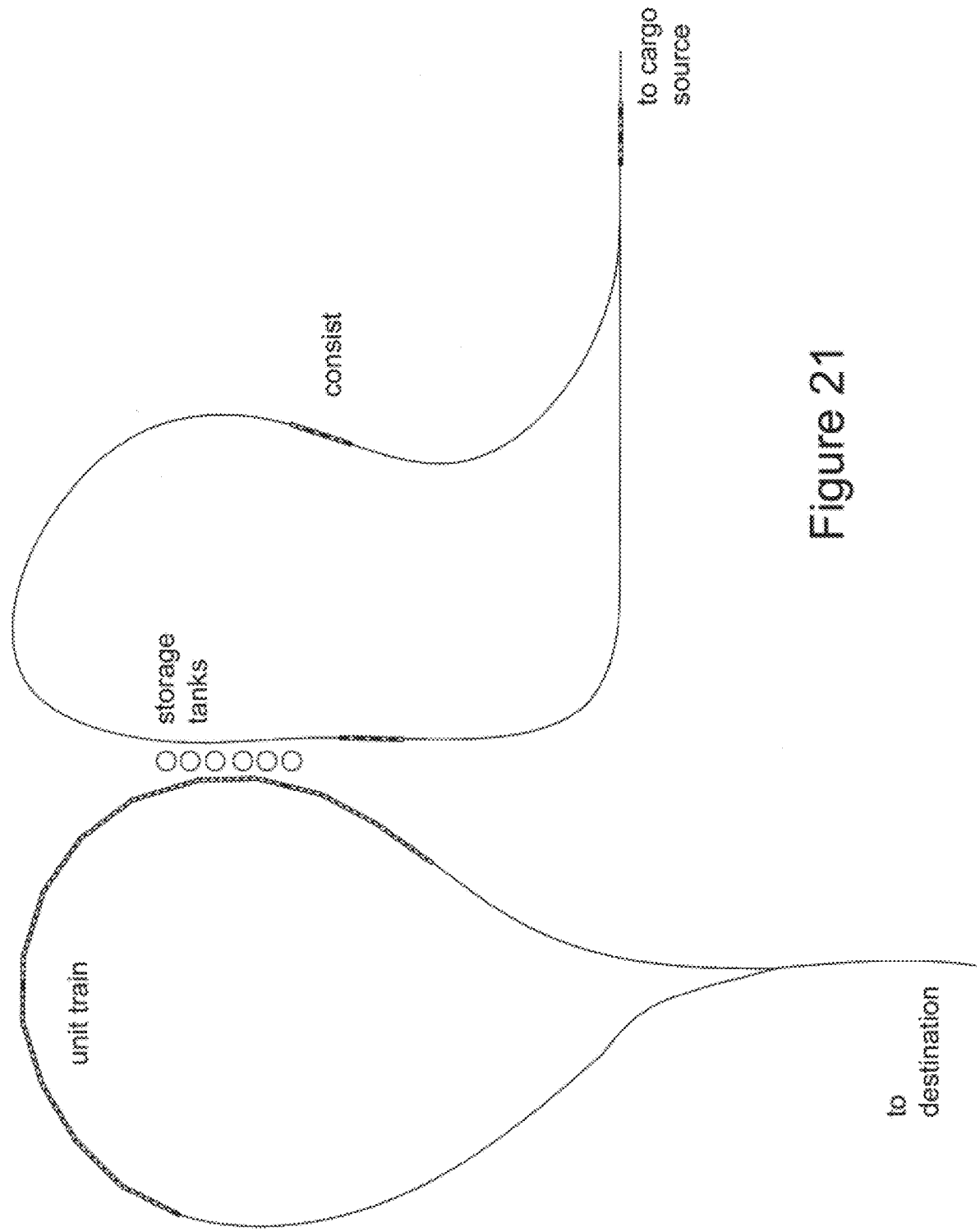
FIG. 21 illustrates a transfer station of the present disclosure.

FIG. 21 illustrates a transfer station of the present disclosure. The transfer station includes a bank of storage tanks which may be oil storage, chemical storage, grain storage and the like. The storage tanks are loaded by consists of 1 to 30 rail cars which shuttle their cargos by rail to the storage tanks from scattered sources. The sources are generally serviced by railroad tracks that cannot accommodate a heavy unit train but can accommodate a short consist. As in FIGS. 19 and 20, a long unit train enters the rail loop on the right side of the figure, and, as each of the cars in the long unit train passes the storage tanks, it is loaded with cargo in the bank of storage tanks.

Figure 22:
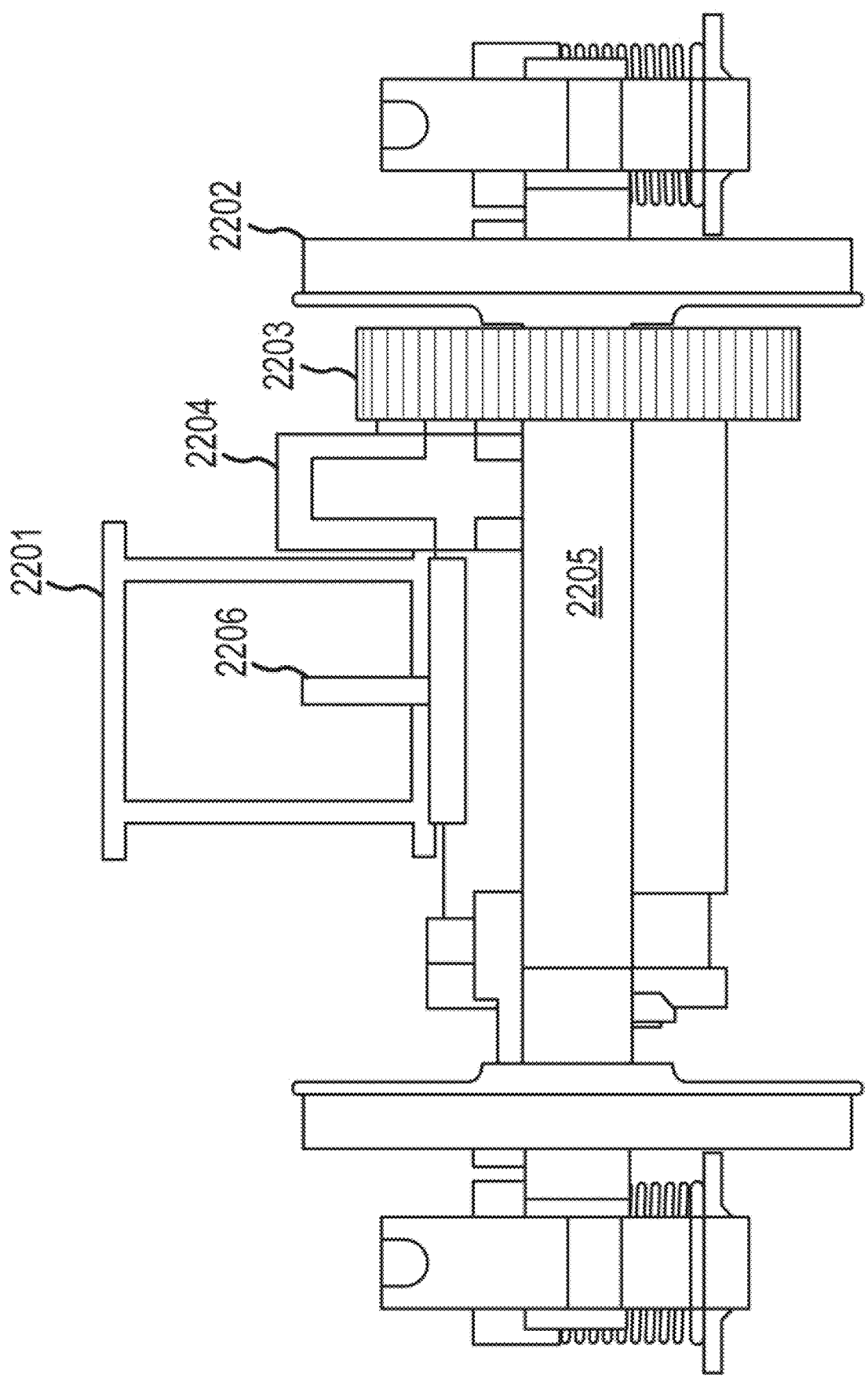
FIG. 22 is a front view illustrating a possible gear arrangement for a motorized freight truck.

FIG. 22 illustrates a possible gear arrangement for a motorized freight truck. A high speed bull gear (not shown as inside housing 2204) and an axle mounted bull gear 2203 are shown on the same side of the truck assembly. A traction motor turns a high speed pinion gear (not shown but positioned below a longitudinal axis of symmetry of the bull gear 2203) that rotatably drives the high speed bull gear (inside housing 2204), which, in turn, rotatably engages a low speed pinion gear. The low speed pinion gear rotatably drives the rigidly axle mounted bull gear 2203. An axle 2205 rigidly connects rail car wheels 2202 on either end of axle 2205. Axle mounted bull gear 2203 is also rigidly attached to axle 2205. A high speed bull gear is mounted inside housing 2204. The body of the motorized freight car is mounted on box beam 2201. The truck assembly can rotate in a horizontal plane about bolster pin 2206. This ability of the truck assembly to rotate allows the truck assembly to rotate with respect to the rail car body when the rail car transits a curved section of rail. The design shown in FIG. 22 is flawed as the high speed bull gear housing 2204 can interfere with the box beam 2201 on which the rail car body is mounted, when the truck assembly transits a curved section of rail.

As can be seen in FIG. 22, the gear arrangement is positioned between, and interiorly of, the opposing rail car wheels positioned at opposing ends of the axle 2205. The truck assembly includes one or more other axles and attached wheel pairs, which may or may not be powered.

Figure 23:
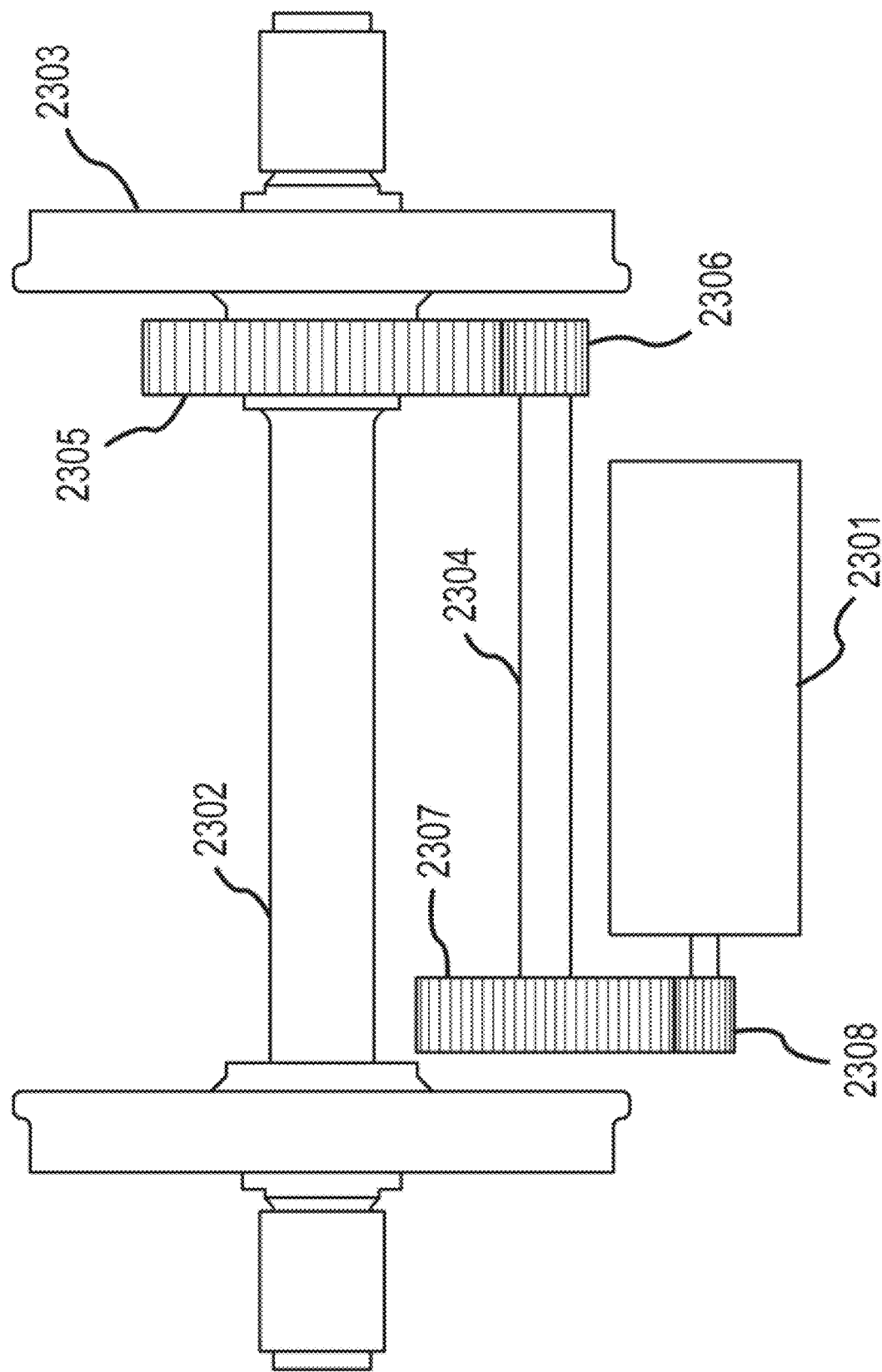
FIG. 23 is a dissembled view illustrating a preferable gear arrangement for a motorized freight truck.

FIG. 23 illustrates a preferable gear arrangement for the motorized freight truck of the present disclosure. A traction motor 2301 turns a high speed pinion (e.g., an output pinion) 2308 that rotatably drives a high speed bull gear (e.g., a second bull gear) 2307 rigidly attached to one end of a lay shaft 2304. A low speed pinion gear 2306 (e.g., a second pinion gear) rigidly attached to the other end of lay shaft 2304 rotatably drives an axle mounted bull gear 2305 (e.g., a first bull gear). The axle 2302 rotatably connects two rail car wheels 2303. The high speed bull gear 2307 and the axle mounted bull gear 2305 are shown on opposite sides of the truck assembly. This design removes the high speed bull gear 2307 as far as possible from the box beam on which the rail car body is mounted and, as a result, there is no interference between the two bull gears and the box beam when the truck assembly transits a curved section of rail.

The longitudinal axes of symmetry of the axle 2302 and the lay shaft 2304 are substantially parallel to each other. The longitudinal axis of symmetry of the lay shaft 2304 is typically positioned at a same height as or below the height of the axle 2302.

Figure 24:
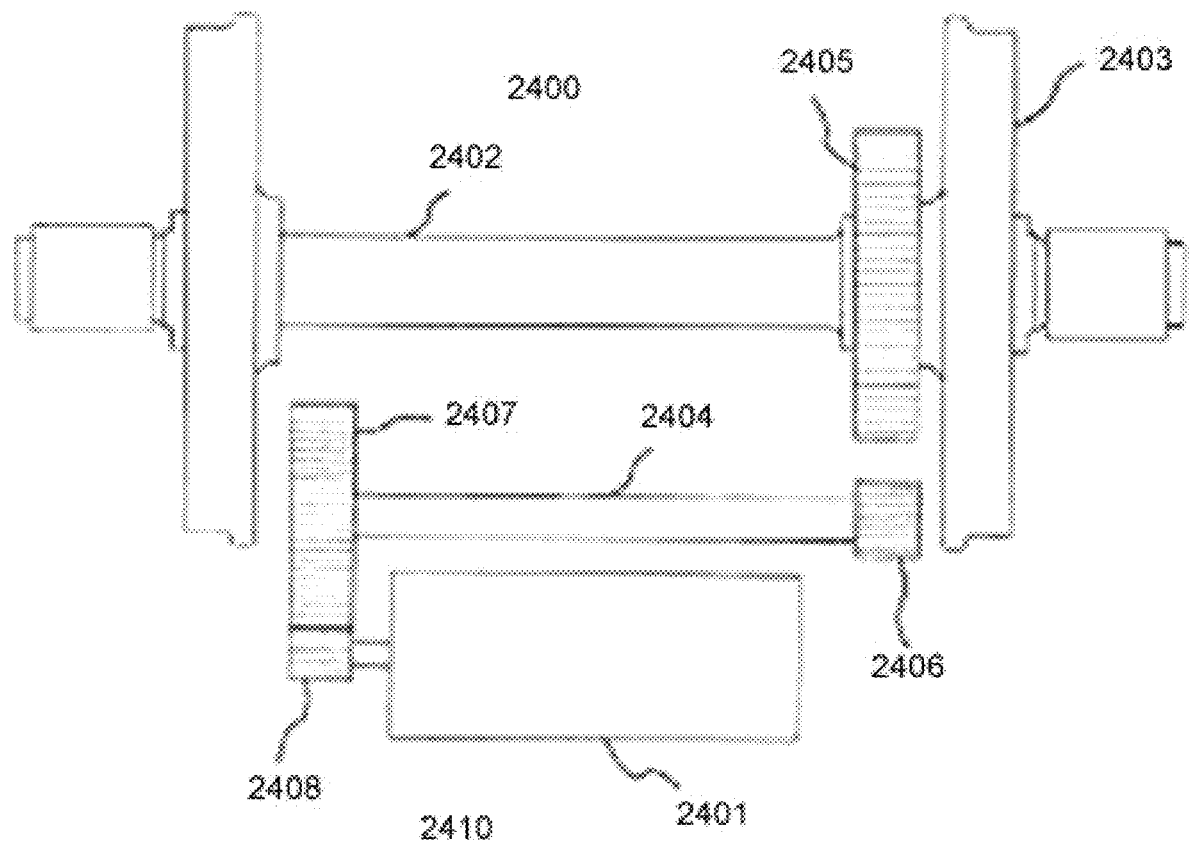
FIG. 24 is a dissembled view illustrating a removable axle arrangement for a motorized freight truck.

FIG. 24 illustrates a removable axle arrangement for a motorized freight truck. A traction motor 2401 is connected to high speed pinion 2408 that rigidly drives a high speed bull gear 2407 rigidly attached to one end of a lay shaft 2404. A low speed pinion gear 2406 is rigidly attached to the other end of lay shaft 2404. These components comprise module 2410 which is permanently attached to the freight car truck assembly.

Detachable module 2400 is comprised of axle 2402 on which both wheels 2403 and axle mounted bull gear 2405 are rigidly mounted. The high speed bull gear 2407 and the axle mounted bull gear 2405 are shown on opposite sides of the truck assembly. As shown, longitudinal axes of symmetry of the lay shaft 2412 and axle 2402 are substantially mutually parallel to each other.

The high speed pinion gear 2408 rotatably drives the high speed bull gear 2407, the high speed pinion gear 2406 rigidly attached to the high speed bull gear 2407, in response, rotatably drives the rigidly axle mounted bull gear 2405, which in turn causes the axle 2400 and rigidly attached rail car wheels 2403 to rotate and displace the rail car along the railway.

The axle with mounted wheels 2403 and bull gear 2405 forming detachable module 2400 can be separated from the rest of the power train module 2410. Module 2400 can then be handled in like a typical locomotive axle for wheel re-profiling (turning on a wheel lathe) or wheel replacement.

A number of variations and modifications of the disclosures can be used. As will be appreciated, it would be possible to provide for some features of the disclosures without providing others.

The present disclosure, in various embodiments, includes components, methods, processes, systems and/or apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover though the description of the disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed:

1. A truck assembly for one or more burden rail cars, comprising:
   an axle comprising opposing first and second wheels disposed at first and second ends of the axle, respectively, and a first bull gear positioned proximate to the second end, wherein the first and second wheels and the first bull gear are rigidly connected to the axle such that the first and second wheels and axle rotate in response to rotation of the first bull gear;
   a traction motor comprising an output shaft and an output pinion gear rigidly attached to the output shaft such that the output pinion gear rotates in response to rotation of the output shaft;
   a box beam configured to receive the one or more burden rail cars and to connect the one or more burden rail cars to the truck assembly;
   a lay shaft positioned between the first and second wheels, the lay shaft comprising a second bull gear rigidly connected to a first end of the lay shaft and a second pinion gear rigidly connected to an opposing second end of the lay shaft such that rotation of the second bull gear causes rotation of the lay shaft and the second pinion gear, wherein the output pinion gear operably engages and drives the second bull gear and the second pinion gear operably engages and drives the first bull gear to transfer an input torque of the motor to an output torque of the axle,
   wherein a longitudinal axis of symmetry of the lay shaft is positioned at a same height as or below a height of a longitudinal axis of symmetry of the axle, and
   wherein the box beam is positioned between the first bull gear and the second bull gear.

2. The truck assembly of claim 1, wherein the first bull gear comprises low speed bull gear, the second bull gear comprises a high speed bull gear, and the second pinion gear comprises a low speed pinion gear.

3. The truck assembly of claim 1, wherein a diameter of the first bull gear is larger than a diameter of the second bull gear and wherein the axle, output shaft, and lay shaft each have a longitudinal axis of symmetry and the longitudinal axes of symmetry are mutually parallel.

4. The truck assembly of claim 1, wherein the output pinion gear, first bull gear, second bull gear, and second pinion gear are located closer to the second wheel than to the first wheel.

5. The truck assembly of claim 1, wherein the output pinion gear and second bull gear are located nearer to the first wheel than the second wheel and the second pinion gear and first bull gear are located closer to the first wheel than the second wheel.

6. The truck assembly of claim 1, wherein the motor and lay shaft are removably connected to the axle to enable re-profiling or replacement of one or more of the first and second wheels.

7. The truck assembly of claim 5, wherein the motor is positioned between the second bull gear and second pinion gear.

8. The truck assembly of claim 4, wherein the motor is positioned between the first wheel on the one hand, first bull gear, second bull gear, and second pinion gear on the other hand.

9. A burden rail car, comprising:
a structure for carrying cargo;
a plurality of truck assemblies, each truck assembly comprising one or more axles;
an on-board power source to provide propulsion power to at least one of the axles of each of the one or more burden rail cars;
a traction motor comprising an output shaft and an output pinion gear rigidly attached to the output shaft such that the output pinion gear rotates in response to rotation of the output shaft; and
a control interface operable to receive and process commands, and to execute selected functions, the selected functions comprising a plurality of start, brake, speed setting, gear setting, power source activation, power source deactivation, load cargo, and unload cargo;
wherein a first truck assembly of the plurality of truck assemblies comprises:
a box beam for supporting a corresponding burden rail car;
an axle comprising opposing first and second wheels disposed at first and second ends of the axle, respectively, and a first bull gear positioned proximate to the second end, wherein the first and second wheels and the first bull gear are rigidly connected to the axle such that the first and second wheels and axle rotate in response to rotation of the first bull gear; and
a lay shaft positioned between the first and second wheels, the lay shaft comprising a second bull gear rigidly connected to a first end of the lay shaft and a second pinion gear rigidly connected to an opposing second end of the lay shaft such that rotation of the second bull gear causes rotation of the lay shaft and the second pinion gear, wherein the output pinion gear operably engages and drives the second bull gear and the second pinion gear operably engages and drives the first bull gear to transfer an input torque of the motor to an output torque of the axle,
wherein a longitudinal axis of symmetry of the lay shaft is positioned at a same height as or below a height of a longitudinal axis of symmetry of the axle, and
wherein the box beam is positioned between the first bull gear and the second bull gear.

10. The burden rail car of claim 9, wherein the on-board power source is at least one of an engine, an energy storage system and a power grid current collector, wherein the power source drives at least one of a generator, an alternator, and a hydraulic pump to power the traction motor, wherein a ratio of the number of driver axles to the number of total axles in the plurality of truck assemblies is at least 0.167, wherein the structure for carrying cargo is configured to carry at least approximately 20 tons, wherein the rail car is configured to ascend, without wheel slippage, a grade of at least 10 degrees, wherein the commands are received from at least one of a remotely located operator and computer, wherein the control interface is configured to collect a plurality of measured parameters from on board sensors and provide the measured parameters to the at least one of the remote operator and computer, wherein the measured parameters comprise engine temperature, fluid pressure, engine revolutions per minute, rail car speed, rail car acceleration, currently traversed grade, fuel level, and available stored energy, and wherein the control interface is configured to collect at least one of still and video images of at least one of a portion of the rail car and an object near the rail car.

11. The burden rail car of claim 9, further comprising a remotely located or on-board memory including an electronic representation of a section of a railway, wherein the commands are received from at least one of a remotely located and on-board processor executing automation logic, wherein the at least one of the remotely located and on-board processor receives at least one of current location information from a satellite positioning system and a rail-side signal emitter, and wherein the at least one of the remotely located and on board processor, based on the current location information and electronic representation, determines, from the automation logic, a value of the selected function, and wherein the electronic representation comprises one of rail section length, rail section grade, rail section configuration, rail section type, speed setting, maximum emission level, identity of power source to be used, and distance to a destination.

12. The burden rail car of claim 9, wherein a diameter of the first bull gear is larger than a diameter of the second bull gear and wherein the axle, output shaft, and lay shaft each have an axis of symmetry and the axes of symmetry are mutually parallel.

13. The burden rail car of claim 9, wherein the output pinion gear, first bull gear, second bull gear, and second pinion gear are located closer to the second wheel than to the first wheel and wherein the traction motor is positioned between the first wheel on the one hand, first bull gear, second bull gear, and second pinion gear on the other hand.

14. The truck assembly of claim 9, wherein the output pinion gear and second bull gear are located near to the first wheel than the second wheel, wherein the second pinion gear and first bull gear are located closer to the first wheel than the second wheel, and wherein the traction motor is positioned between the second bull gear and second pinion gear.

15. The burden rail car of claim 9, wherein the traction motor and lay shaft are removably connected to the axle to enable reprofiling or replacement of one or more of the first and second wheels.

16. A method, comprising:
providing a haulage railway, the railway having at least one loading point and at least one unloading point;
providing a plurality of burden rail cars traversing the haulage railway, each of the burden rail cars comprising:
a structure for carrying cargo;
a plurality of truck assemblies, each truck assembly comprising one or more axles and a box beam for supporting the structure for carrying cargo;
an on board power source to provide propulsive power to at least one of the axles of the one or more burden rail cars; and a control interface operable to receive and process commands, to execute selected functions, wherein the commands are received from at least one of a remotely located operator, a remotely located computer, and an on board processor executing automation logic;

loading each burden rail car with cargo at the at least one loading point;

causing displacement of each loaded burden car along haulage railway by a traction motor providing output torque to an output pinion gear, whereby the output pinion gear operably engages and drives a second bull gear connected to a lay shaft and a second pinion gear connected to the second bull gear and the second pinion gear operably engages and drives a first bull gear connected to an axle of a truck assembly to transfer an input torque of the motor to an output torque of the axle, wherein a longitudinal axis of symmetry of the lay shaft is positioned at a same height as or below a height of a longitudinal axis of symmetry of the axle and wherein the box beam is positioned between the first bull gear and the second bull gear; and unloading, from each burden rail car, the cargo at the at least one unloading point.

17. The method of claim 16, wherein the commands are received from a remotely located operator and further comprising:

collecting, by the control interface of a selected burden rail car, a plurality of measured parameters from on board sensors;

collecting, by the control interface of the selected burden rail car, at least one of still and video images of at least one of a portion of the burden rail car and an object near the burden rail car; and providing, by the control interface of the selected burden rail car, the measured parameters to the remote operator, wherein the measured parameters comprise engine temperature, fluid pressure, engine revolutions per minute, speed, acceleration, currently traversed grade, fuel level, and available stored energy;

position of electrical current collector apparatus; and receiving and processing, by the control interface of the selected burden rail car, commands from the operator.

18. The method of claim 16, wherein a selected burden rail car comprises at least one of a remotely located and on-board memory including an electronic representation of a section of a railway and wherein the commands are received from an on board processor executing automation logic and further comprising:

receiving, by the on board processor, at least one of current location information from a satellite positioning system and a rail-side signal emitter;

determining, by the on board processor and based on the current location information and electronic representation, a value associated with the selected function; and inputting, by the on board processor, the value in the automated logic to generate a command.

19. The method of claim 18, wherein a first value of the selected function is automated state and a second value of the selected function is one of manual and remote control state and wherein the second value is selected when the burden rail car is engaged in one of cargo load and cargo unload operations.

20. The method of claim 16, wherein the first bull gear comprises low speed bull gear, the second bull gear comprises a high speed bull gear, and the second pinion gear comprises a low speed pinion gear and wherein a diameter of the first bull gear is larger than a diameter of the second bull gear and wherein the axle, output shaft, and lay shaft each have a longitudinal axis of symmetry and the longitudinal axes of symmetry are mutually parallel.

21. The method of claim 16, wherein the output pinion gear, first bull gear, second bull gear, and second pinion gear are located closer to a second wheel than to a first wheel on a common axle and wherein the traction motor is positioned between the first wheel on the one hand, first bull gear, second bull gear, and second pinion gear on the other hand.

22. The method of claim 16, wherein the output pinion gear and second bull gear are located near to a first wheel than a second wheel, the first and second wheels being at opposing ends of a common axle, wherein the second pinion gear and first bull gear are located closer to the first wheel than the second wheel, and wherein the traction motor is positioned between the second bull gear and second pinion gear.

23. The burden rail car of claim 16, wherein a lay shaft is rigidly connected to the second bull gear and second pinion gear and further comprising:

removing the traction motor and lay shaft from engagement with the first bull gear on an axle to enable reprofiling or replacement of one or more of wheels on the axle.

* * * * *